(12) United States Patent
Okamoto et al.

(10) Patent No.: US 7,726,373 B2
(45) Date of Patent: Jun. 1, 2010

(54) CORD AND PELLET MANUFACTURING APPARATUS

(75) Inventors: Masahiro Okamoto, Ehime (JP);
Masatoshi Nakagawa, Ehime (JP);
Kazunori Shinohara, Ehime (JP)

(73) Assignee: Maruyasu Co., Ltd., Ehime (JP)

( * ) Notice: Subject to any disclaimer, the term of this patent is extended or adjusted under 35 U.S.C. 154(b) by 795 days.

(21) Appl. No.: 11/569,922

(22) PCT Filed: Mar. 3, 2005

(86) PCT No.: PCT/JP2005/003619

§ 371 (c)(1),
(2), (4) Date: Dec. 1, 2006

(87) PCT Pub. No.: WO2005/121441

PCT Pub. Date: Dec. 22, 2005

(65) Prior Publication Data

US 2008/0038397 A1    Feb. 14, 2008

(30) Foreign Application Priority Data

Jun. 11, 2004   (JP) .............................. 2004-174408
Dec. 22, 2004   (JP) .............................. 2004-371756

(51) Int. Cl.
*B32B 37/00* (2006.01)
(52) U.S. Cl. .................. 156/510; 156/553; 156/555; 156/582; 425/308; 425/316
(58) Field of Classification Search ............ 156/538, 156/553, 555, 556, 580, 582, 510; 425/111, 425/308, 315, 316
See application file for complete search history.

(56) References Cited

U.S. PATENT DOCUMENTS 5,447,793 A * 9/1995 Montsinger .................. 428/373
6,187,358 B1 * 2/2001 Inoue et al. .................. 426/503

FOREIGN PATENT DOCUMENTS

| JP | 60221068 | * 11/1985 |
| JP | 6-31368 | 2/1994 |
| JP | 6-39987 | 5/1994 |
| JP | 7-324245 | 12/1995 |

* cited by examiner

*Primary Examiner*—James Sells
(74) *Attorney, Agent, or Firm*—Lucas & Mercanti, LLP

(57) ABSTRACT

The invention provides a manufacturing apparatus of a pellet which has not quality deterioration and a great apparent specific gravity. The apparatus is provided with (a) bunching portions (16) bunching band-like long continuous material(s) (R) and/or a plurality of filamentous long continuous materials (R) to a narrow width so as to form a cord-shaped bunched material (R'), (b) compressing portions (22) having compressing rollers (50a, 50b) with an uneven outer surface and form a cord (S) by point compressing a twisted cord material (R"), (c) rotation portions (14) twisting the cord-shaped bunched material (R') by relatively rotating the bunching portions (16) or the compressing portions (22) so as to form the twisted cord material (R"), and (d) a cutting portion (102) provided in an outlet side of the compressing portion (22) and cutting the cord (S) formed by the point compressing to a pellet shape.

2 Claims, 17 Drawing Sheets

(A) Top view (B) Front view

CORD AND PELLET MANUFACTURING APPARATUS

TECHNICAL FIELD

The present invention relates to a cord and a pellet utilizing a band-like or filamentous long continuous material, a manufacturing method of the cord and the pellet, and a manufacturing apparatus of the cord and the pellet.

BACKGROUND ART

In the light of an improvement of consciousness about an environmental problem, a cost reduction or the like in recent years, in a forming work of a resin product, there has been generally executed a recycle of a lot of defective units generated in a forming process (for example, a formed product in a production preparing step until a proper standardized product is formed at a trial operation time or a defective unit caused by a trouble at the forming time) as a raw material.

As an example, for example, a technique for manufacturing a resin pellet serving as a recycle raw material from a long resin material corresponding to a formed defective unit (or a loss raw material) is disclosed, for example, in Japanese Non-examined Patent Publication No. 49-9560.

DISCLOSURE OF THE INVENTION

Problem to be Solved by the Invention

In the prior art (Japanese Non-examined Patent publication No. 49-9560) mentioned above, the resin pellet is formed by heating and melting a cord-shaped resin material obtained from a tape-shaped resin material by an electrode roll so as to hold a shape thereof, and thereafter the cord-shaped resin material at a predetermined length by a cutting machine.

However, in the prior art, there is a problem that a quality is deteriorated (an alteration of the resin material or a scorch of the resin material is generated) due to an excessive heat application at a time of heating and melting the resin material.

Further, an air vent process or the like is not especially executed at a time of forming the tape-shaped resin material to the cord shape, and a lot of air is contained in an inner portion of the resin after being heated or melted. In other words, an apparent specific gravity of the obtained resin pellet is smaller than that of a solid virgin pellet at an amount of the contained air. Accordingly, in the case that the recycled resin pellet and the solid virgin pellet are mixed and put in a hopper of a forming machine, the recycled resin pellet having the smaller apparent specific gravity is pushed by the solid body having the larger specific gravity so as to lift up. Therefore, a problem that the recycled resin pellet is hard to be supplied to the forming machine in comparison with the virgin pellet is arisen, and a problem that the air content in the mixed molten resin is increased due to an increase of the air content is arisen, so that it is hard to accurately measure the raw material in the case that the recycled resin pellet is utilized as the raw material.

Accordingly, an object of the present invention is to provide a pellet having no quality deterioration and a high apparent specific gravity and being uniform, a manufacturing method of the pellet and a manufacturing apparatus of the pellet, and the other object of the present invention is to provide a cord corresponding to a preliminary step of the pellet and being excellent in a fastening force in itself, a manufacturing method of the cord, and a manufacturing apparatus of the cord.

Means for Solving the Problem

In accordance with a first aspect of the present invention, there is provided a cord (S), wherein one or a plurality of band-like long continuous materials (R) are bunched to a narrow width and twisted into a twist paper, and pressed indentations (Y) are formed on a surface thereof at a predetermined interval.

Further, in accordance with a second aspect of the present invention, there is provided a cord (S), wherein a plurality of filamentous long continuous materials (R) are bunched to one and twisted into a twist paper, and pressed indentations (Y) are formed on a surface thereof at a predetermined interval.

In accordance with these inventions, since one or a plurality of band-like long continuous materials (R) or a plurality of filamentous long continuous materials (R) are twisted into the twist paper, the air hardly exists in the inner portion of the obtained cord (S). Further, since the pressed indentations (Y) are formed on the surface of the cord (S), the laminated long continuous materials (R) constituting the cord (S) are pressed together, and the cord (S) is neither swelled nor loosened. Further, since the pressed indentations (Y) functions as a slip resistance at a time of binding the cord (S), a knot is hard to be loosened.

Moreover, as described in a third aspect, in the case that the band-like long continuous materials (R) or the filamentous long continuous materials (R) are constituted by disposal facilities, a new use application is generated by setting the band-like or filamentous long continuous materials (R) corresponding to the disposal facilities to the cord (S). Further, even in the case of being disposal, since the long continuous materials (R) corresponding to the disposal facilities are twisted and compressed, a bulk of an entire of the disposal facilities becomes smaller, and it is possible to obtain a volume reduction effect at a time of disposing the disposal facilities.

In accordance with a fourth aspect of the present invention, there is provided a pellet (P), wherein the pellet is formed by cutting the cord (S) as recited in any of the first to third aspects in a pellet shape at a predetermined length.

In accordance with this invention, it is possible to obtain the pellet (P) having a large apparent specific gravity, by cutting the cord (S) in which the air hardly exists in an inner portion. In this case, if a torsional degree of the cord (S) is uniform over an entire length of the cord (S), the apparent specific gravity of the pellet (P) obtained by cutting this is constant, and it is possible to obtain a recycled pellet (P) having a high quality.

In accordance with a fifth aspect of the present invention, there is provided a manufacturing method of a cord (S), comprising the steps of bunching one or a plurality of band-like long continuous materials (R) to a narrow width, forming a twist paper shaped cord material (R") by twisting them, and compressing the twist paper shaped cord material (R") by a pair of compression rollers (50a, 50b) with an uneven outer surface.

Further, in accordance with a sixth aspect of the present invention, there is provided a manufacturing method of a cord (S), comprising the steps of bunching a plurality of filamentous long continuous materials (R) to one, forming a twist paper shaped cord material (R") by twisting them, and compressing the twist paper shaped cord material (R") by a pair of compression rollers (50a, 50b) with an uneven outer surface.

In accordance with these inventions, since one or a plurality of band-like long continuous materials (R) are bunched to the narrow width or a plurality of filamentous long continuous materials (R) are bunched to one, and they are twisted, the air hardly exists in the inner portion of the cord (S) obtained in a state in which the air existing between the layers of the long continuous materials (R) is pushed out to the external portion. Further, since the twist paper shaped cord material (R") obtained thereby is structured as one cord material which is thick and bunched, it is possible to form the cord (S) having a high compression ratio and being very durable, by compressing the twisted cord material (R") by the compression rollers (50a, 50b).

Further, the pressed indentations (Y) for formed on the outer surface of the obtained cord (S) in correspondence to the uneven shape formed on the outer surface of the compression rollers (50a, 50b), however, since the laminated long-shaped continuous materials (R) constituting the cord (S) are crimped to each other by the indentations (Y), the cord (S) is neither bulged nor loosened. In this case, since the indentations (Y) formed on the surface of the cord (S) function as the slip resistance, the knot is hard to be loosened.

In accordance with a seventh aspect of the present invention, there is provided a manufacturing method of a pellet (P) comprising the step of cutting the cord (S) obtained in accordance with the method as recited in the fifth or sixth aspect to a pellet shape at a predetermined length.

In accordance with this invention, it is possible to obtain the pellet (P) having a large apparent specific gravity by cutting the cord (S) in which the air hardly exists in the inner portion. In this case, if the degree of twisting is set to be uniform over an entire length of the cord (S) at a time of forming the cord (S), it is possible to make the apparent specific gravity of the pellet (P) uniform.

Further, in accordance with the method of the present invention, since the pellet (P) can be obtained only by cutting the cord (S) obtained by the twisting step and the compressing step, a conventional heating step is not necessary. Accordingly, a quality deterioration of the pellet (P) is not arisen by heating.

In accordance with an eighth aspect of the present invention, there is provided a manufacturing apparatus (10A, 10B) of a cord, comprising (a) bunching portions (16, 16') bunching one or a plurality of band-like long continuous materials (R) and/or a plurality of filamentous long continuous materials (R) to a narrow width so as to form a cord-shaped bunched material (R'), (b) compressing portions (22, 22') having a pair of compressing rollers (50a, 50b) with an uneven outer surface and form a cord (S) by point compressing a twisted cord material (R"), and (c) rotation portions (14, 14') twisting the cord-shaped bunched material (R') by relatively rotating the bunching portions (16, 16') or the compressing portions (22, 22') so as to form the twisted cord material (R").

Further, in accordance with a ninth aspect of the present invention, there is provided a manufacturing apparatus (10C) of a cord, comprising (a) one or a plurality of long continuous material wind-up body (W) winding up band-like long continuous materials (R) and/or filamentous long continuous materials (R) around a tube shaft (X), (b) a compressing portion (22') having a pair of compressing rollers (50a, 50b) with an uneven outer surface and forms a cord (S) by point compressing a twisted cord material (R"), and (c) a rotation portion (14') twisting the long continuous material (R) taken out from the long continuous material wind-up body (W) by relatively rotating the long continuous material wind-up body (W) or the compressing portion (22') so as to form the twisted cord material (R").

Further, in accordance with a tenth aspect of the present invention, there is provided a manufacturing apparatus (10A, 10B) of a cord, comprising (a) a bunching portion (16) bunching one or a plurality of band-like long continuous materials (R) and/or a plurality of filamentous long continuous materials (R) to a narrow width so as to form a cord-shaped bunched material (R'), (b) a torsion forming portion (152) having a plurality of twisting rollers (158) spirally arranged in the surface of the cord-shaped bunched material (R') at a predetermined interval in such a manner that an outer surface is brought into contact with the cord-shaped bunched material (R'), and twisting the cord-shaped bunched material (R') on the basis of a rotation of each of the twisting rollers (158) in the same direction so as to form a twisted cord material (R"), and (c) a compressing portion (22') having a pair of compressing rollers (50a, 50b) with an uneven outer surface and form a cord (S) by point compressing the twisted cord material (R").

In these inventions, if the cord-shaped bunched material (R') is twisted, the air existing between the laminated cord-shaped bunched materials (R') is pushed out to the external portion. Further, the twisted cord material (R") structured as one thick and bunched band material is compressed by the compressing portions (22, 22'). Accordingly, it is possible to form the cord (S) having the high compression ratio and being very durable.

Further, since the pressed indentations (Y) can be formed on the outer surface of the cord (S) at the compressing time, the pressed indentations (Y) pressed together the laminated long continuous materials (R) constituting the cord (S) to each other. Accordingly, the cord (S) is neither swelled nor loosened.

In this case, as described in an eleventh aspect of the present invention, a manufacturing apparatus (10E) of a cord may be constituted by (a) a twisted cord material wind-up body holding portion (190) holding a twisted cord material wind-up body (W') winding up a twisted cord material (R") around a tube shaft (X), and (b) a compressing portion (22') having a pair of compressing rollers (50a, 50b) with an uneven outer surface and forms a cord (S) by point compressing the twisted cord material (R") taken out from the twisted cord material wind-up body (W'). In this case, it is also possible to form the very durable cord (S) in the same manner as mentioned above.

In accordance with a twelfth aspect of the present invention, there is provided a manufacturing apparatus (100) of a pellet comprising (a) the manufacturing apparatus of the cord as recited in any of the eighth to eleventh aspects, and (b) cutting portions (102, 222) provided in an outlet side of the compressing portions (22, 22') constituting each of the manufacturing apparatuses (10A to 10E) of the cord, and cutting the cord (S) formed by a point compression in a pellet shape at a predetermined interval.

In this invention, it is possible to form the pellet (P) having the large apparent density by cutting the cord (S) in which the air hardly exists in the inner portion and the compression ratio is high. In this case, if the degree of twisting of the cord-shaped bunched material (R') is made uniform, the thickness of the twisted cord material (R") becomes uniform over an entire length thereof. Accordingly, the value of the apparent density of the pellet (P) becomes uniform.

Further, the pressed indentations (Y) are formed on the outer surface of the pellet (P), and the pressed indentations (Y) can press together the laminated long continuous materials (R) constituting the pellet (P) to each other. Accordingly, the pellet (P) is neither swelled nor loosened.

In accordance with a thirteenth aspect of the present invention, there is provided a manufacturing apparatus (200) of a pellet comprising (a) a rotation frame (218) forming a cord-shaped bunched material (R') by bunching one or a plurality of band-shaped long continuous materials (R) and/or a plurality of filamentous long continuous materials (R) to a narrow width, and guiding to a rear compressing portion (220) in which a feeding direction is inverted in the middle, (b) a rotation portion (204) twisting the cord-shaped bunched material (R') by rotating the rotation frame (218) in such a manner that a rotating axis is almost in parallel to a feeding direction of the cord-shaped bunched material (R') so as to form a twisted cord material (R"), (c) a compressing portion (220) having a pair of compressing rollers (50*a*, 50*b*) which have concavity and convexity formed on an outer surface and form a cord (S) by point compressing the twisted cord material (R"), and (d) a cutting portion (222) provided in an outlet side of the compressing portion (220) and cutting the cord (S) formed by the point compression to a pellet shape.

In this invention, it is also possible to form the pellet (P) having the large apparent density by cutting the cord (S) in which the air hardly exists in the inner portion and the compression ratio is high. In this case, in this invention, since the feeding direction of the cord-shaped bunched material (R') is inverted in the middle, the cord-shaped bunched material (R') is twisted at two times if the rotation frame (218) is rotated at one time.

EFFECT OF THE INVENTION

In accordance with the inventions described in the first to third aspects, the fifth to sixth aspects and the eighth to eleventh aspects, it is possible to obtain the cord having the high compression ratio and being very durable. Further, the cord is neither swelled nor loosened due to the existence of the indentations formed on the surface of the cord, and it is possible to hold the shape over a long period. In this case, since the pressed indentation also functions as the slip resistance, it is possible to prevent the knot from being loosened at a time of binding the cord.

In accordance with the inventions described in the fourth, seventh, twelfth and thirteenth aspects, it is possible to obtain the pellet having the apparent specific gravity. In this case, if the degree of twisting of the cord-shaped bunched material is made constant, it is possible to make the apparent specific gravity of the pellet uniform. Further, since the pressed indentations are formed on the surface of the cord, and the constituting materials of the laminated long continuous materials constituting the cord are pressed together to each other, the pellet is neither swelled nor loosened, and it is possible to hold the shape over a long period. Further, since the conventional heating step is not included, it is possible to obtain a high-quality pellet having no quality deterioration.

DESCRIPTION OF REFERENCE SYMBOLS

Figure 1:
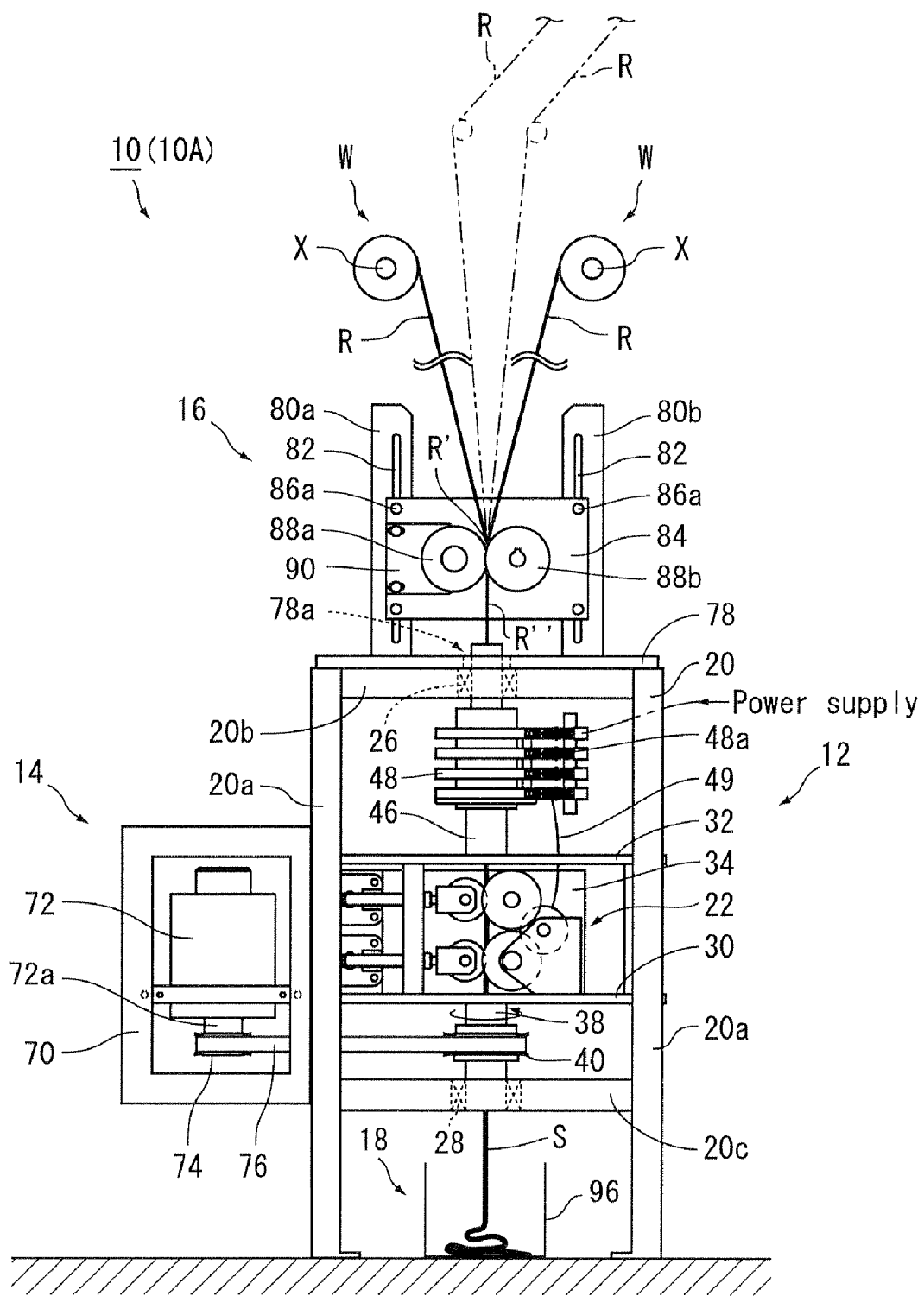
FIG. 1 is a front view showing a manufacturing apparatus of a cord in accordance with the present invention.

P pellet
R long continuous material
R' cord-shaped bunched material
R" twisted cord material
S cord
Y dented portion
10 manufacturing apparatus of cord
12 apparatus main body
14 rotation portion
16 bunching portion
18 cord recovery portion
22 compressing portion
100 manufacturing apparatus of pellet
102 cutting portion
104 pellet recovery portion
108 cutting portion

BEST MODE FOR CARRYING OUT THE INVENTION

A description will be in detail given below of the present invention in accordance with an illustrated embodiment. A manufacturing apparatus 10 of a cord in accordance with the present invention includes first to fifth embodiments 10A to 10E, and a description will be given of them with reference to the accompanying drawings, sequentially. The description of the present invention is given by setting the first embodiment 10A to a typical embodiment, and is given only of the different portions while omitting common portions for avoiding a complication of the description in the second embodiment 10B and after.

Embodiment 1

A manufacturing apparatus 10A of a cord in accordance with a first embodiment is structured such as to draw out a long continuous material R from two long continuous material wind-up bodies W as shown in FIG. 1 (however, a number of the long continuous material wind-up body W may be, of course, set to one or three or more), and manufacture a cord S by using the long continuous material R as a material.

Figure 6:
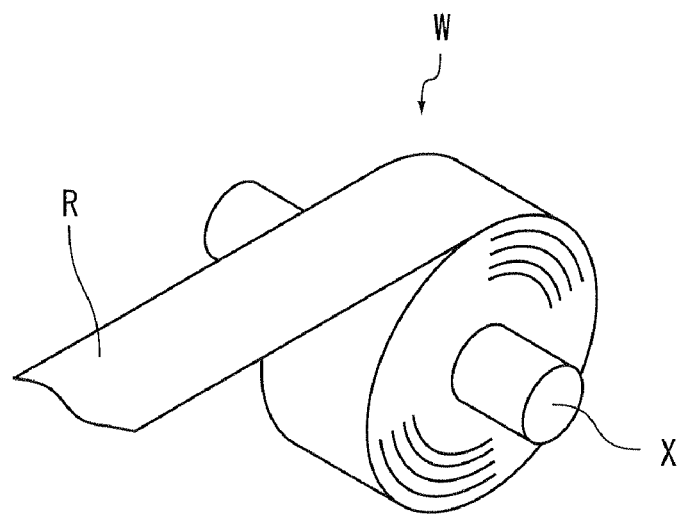
FIG. 6 is a perspective view showing a long continuous material wind-up body.

In this case, there is shown one example of the long continuous material wind-up body W, in which the long continuous material R is wound up around a tube shaft X as shown in FIG. 6. A material of the long continuous material R can use any materials as far as the material can be twisted, pressed indentations Y can be formed in a surface thereof in a dot shape, and a portion forming the pressed indentations Y are fused or bonded so as to maintain a twist. In the present embodiment, there is employed a synthetic resin film (a low density (or high density) polyethylene resin) having a thickness of 10 to 100 μm and a width of 10 to 100 mm), and a cut portion (a normally called edge end in which a short weft is entwined to a plurality of warps) in both side ends of a cloth weaved by an automatic weaving machine. Of course, a paper may be used as far as the condition mentioned above can be achieved, without being limited to them. In this case, the material such as the synthetic resin film is called as a band-like long continuous material, and the material such as the edge end is called as a filamentous long continuous material. In the case they are not differentiated, they are called simply as the long continuous material.

Figure 7:
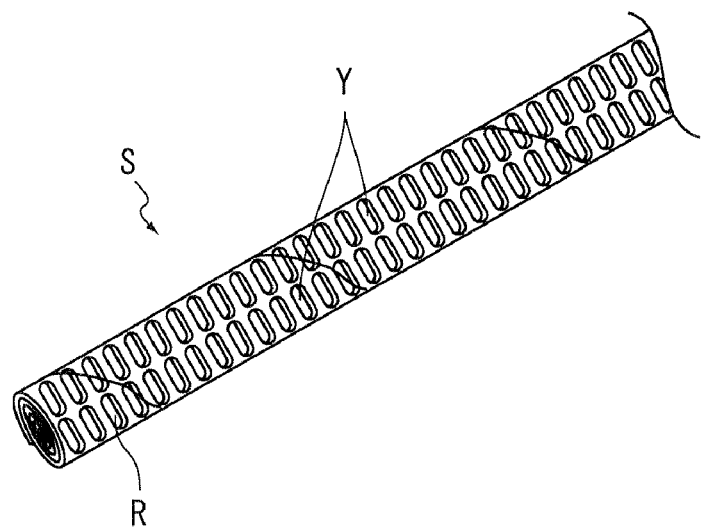
FIG. 7 is a (partly omitted) perspective view showing the cord.

Further, the cord S is obtained by forming the dented pressed indentations Y on an outer surface of the long continuous material R twisted in a twist paper shape, as shown in FIG. 7. In this case, the dented shape mentioned above corresponds to a concept including an almost U shape, an almost V shape and an almost C shape.

The cord manufacturing apparatus 10A is provided with an apparatus main body 12, a rotation portion 14, a bunching portion 16 and a cord recovery portion 18, as shown in FIG. 1.

The apparatus main body 12 is constituted by a frame 20 and a compressing portion 22. The frame 20 corresponds to a portion forming a skeleton of the apparatus main body 12, and is provided with a plurality of (four in the present embodiment) support columns 20a formed by an elongated rod-like member (for example, an L-shaped steel), an upper plate 20b provided in an upper end portion of the support column 20a, and an intermediate plate 20c provided at an almost intermediate position in a height direction of the support column 20a. An upper bearing member 26 is fixed to the upper plate 20b, and a lower bearing member 28 is fixed to the intermediate plate 20c.

Figure 2:
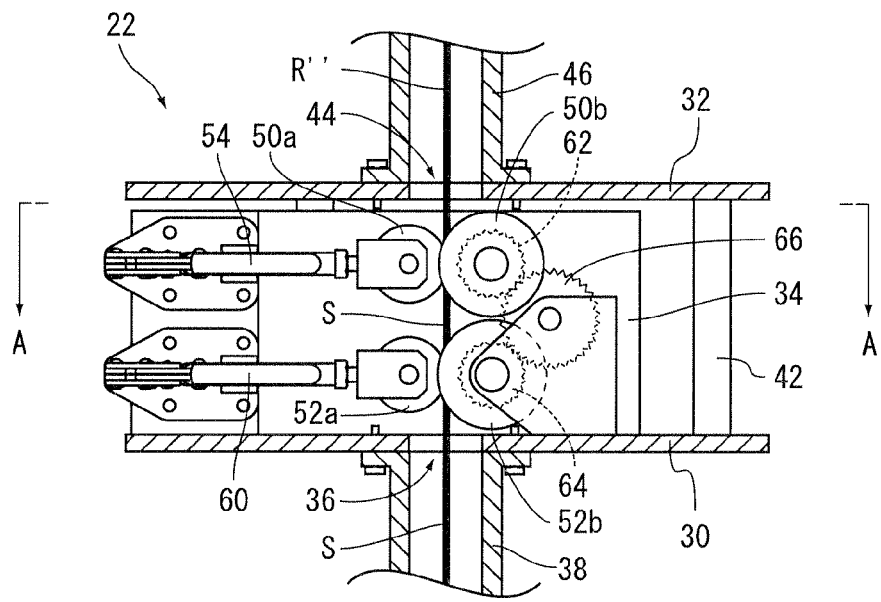
FIG. 2 is a front view (a partially sectional view) showing a compressing portion.
Figure 3:
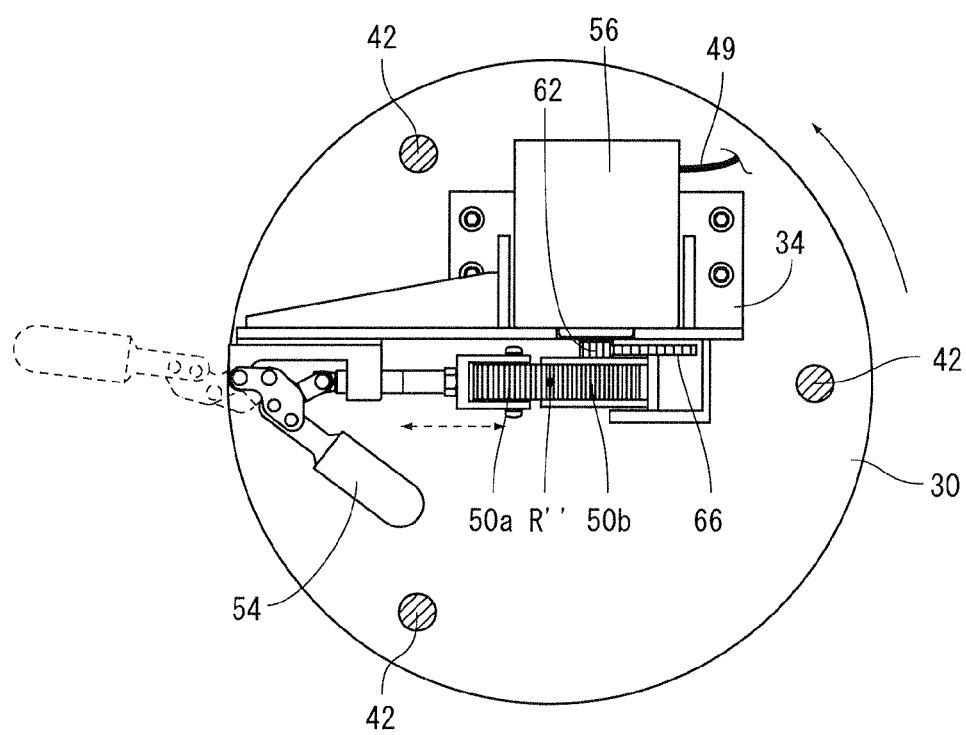
FIG. 3 is a sectional view along a line A-A in FIG. 2.

The compressing portion 22 has a lower table 30, an upper table 32 and a roller mounting plate 34, as shown in FIGS. 2 to 3.

The lower table 30 is constituted by a disc-shaped member, and a hole 36 is formed in a center thereof. A tubular shaft body 38 having an almost equal inner diameter to an inner diameter of the hole 36 is attached to a lower surface side of the lower table 30 in conformity to a position of the hole 36, and a lower end portion of the shaft body 38 is rotatably supported to the lower bearing member 28. In this case, a driven pulley 40 is integrally provided in a middle stage portion of the shaft body 38.

A roller mounting plate 34 and a plurality of (three in the present embodiment) support columns 42 are provided in a upright position on an upper surface of the lower table 30, and the upper table 32 is attached to an upper end portion of the support columns 42.

The upper table 32 corresponds to a disc-shaped member formed at an almost equal size to the lower table 30, and a hole 44 is formed in a center thereof. A tubular shaft body 46 having an almost equal inner diameter to an inner diameter of the hole 44 is attached to an upper surface side of the upper table 32 in conformity to a position of the hole 44, and an upper end portion of the shaft body 46 is rotatably supported to the upper bearing member 26. Further, a slip ring 48 for supplying an electric power to a motor 56 mentioned below is attached to a middle stage portion of the shaft body 46, and a feeding brush 48a provided in a fixed side of the frame 20 side is brought into slidable contact with the slip ring 48. In this case, the shaft bodies 38 and 46 are attached coaxially.

The roller mounting plate 34 corresponds to a plate-shaped member formed by bending in an almost L shape, and two pairs of rollers are attached to a front surface side thereof so as to be arranged up and down (refer to FIG. 2). In this case, a pair of rollers in the upper side correspond to compressing rollers 50a and 50b, and a pair of rollers in the lower side correspond to a drawing rollers 52a and 52b.

In FIG. 2, one (a left side in FIG. 2) compressing roller 50a (in a movable side) is rotatably attached to a leading end of a toggle clamp 54 fixed to the roller mounting plate 34, and the other compressing roller 50b (in a fixed side) is firmly fixed to a leading end of a rotating shaft of a motor 56 fixed to the roller mounting plate 34. Moreover, a gear 62 is attached to a middle stage portion of the rotating shaft. In this case, if the toggle clamp 54 is moved down toward the compressing roller 50b in the fixed side, the compressing roller 50a and the compressing roller 50b are come in contact with each other.

Figure 5:
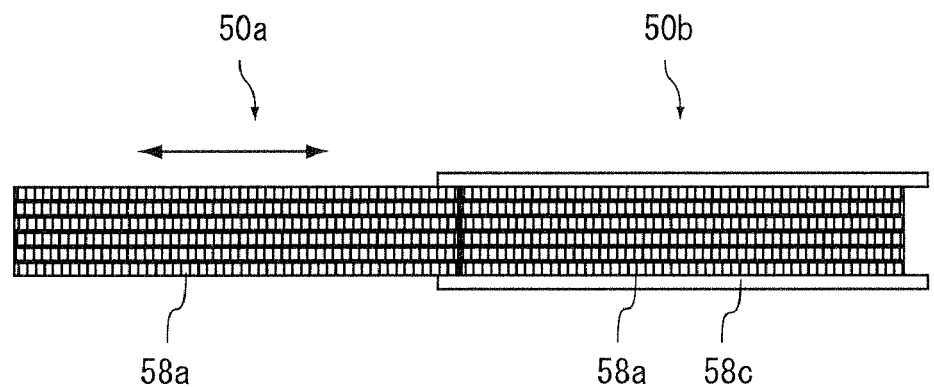
FIG. 5 is a figure showing a compressing roller.
Figure 5:
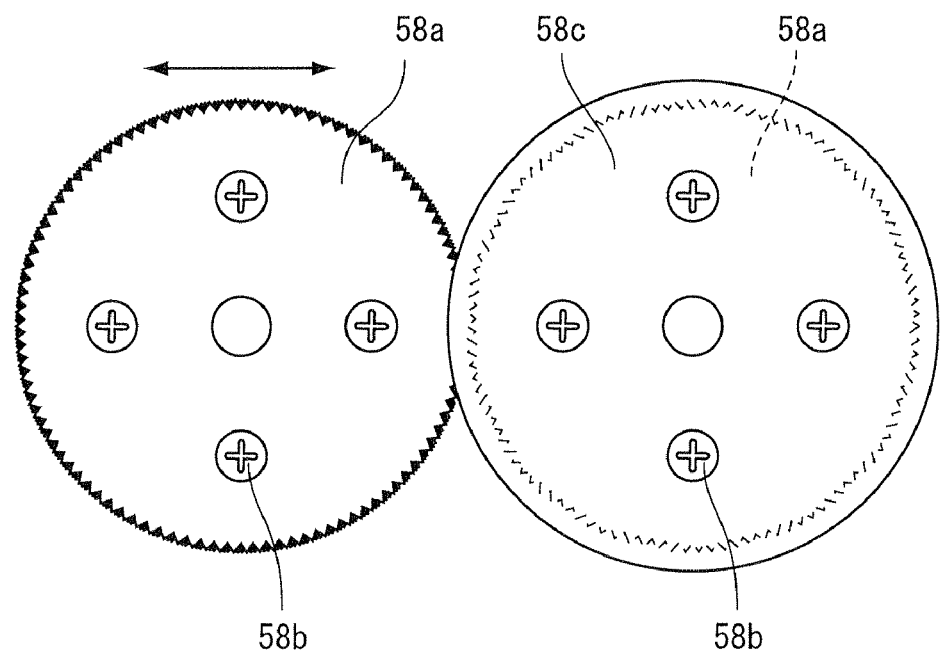

Each of the compressing rollers 50a and 50b is constituted by a disc-shaped member in which a dented portion is formed in an outer surface, and is structured, in the present embodiment, by integrally forming a plurality of (six in the present embodiment) disc-shaped members 58a having a dented portion formed in an outer surface by a fastening member 58b such as a screw or the like, as shown in FIG. 5 (in which a little gap is provided between the respective disc-shaped members 58a). In this case, a stopper member 58c having a larger outer diameter than the disc-shaped member 58a is attached to both ends in an axial direction of the compressing roller 50b in the fixed side.

Further, in FIG. 2, one (a left side in FIG. 2) drawing roller 52a (in a movable side) is rotatably attached to a leading end of a toggle clamp 60 fixed to the roller mounting plate 34, and the other drawing roller 52b (in a fixed side) is rotatably mounted via a gear 64 attached to a front surface side of the roller mounting plate 34. Moreover, since the gear 62 and the gear 64 are coupled to each other via a coupling gear 66, the compressing roller 50b and the drawing roller 52b are rotated at the same angular velocity.

In this case, if the toggle clamp 60 is moved down toward the drawing roller 52b in the fixed side, the drawing roller 52a in the movable side comes close to the drawing roller 52b in the fixed side. Moreover, a distance between the drawing rollers 52a and 52b can be appropriately set such that the cord S discharged from the compressing rollers 50a and 50b can be discharged downward with no slack, and the drawing rollers 52a and 52b and the cord S are slipped and the cord S is not cut by a tension in the case that an excessive tension is applied to the cord S between the compressing rollers 50a and 50b and the drawing rollers 52a and 52b.

Each of the drawing rollers 52a and 52b is provided as occasion demands in such a manner that the cord S formed by the compressing rollers 50a and 50b can be securely discharged to a cord recovery portion 18 without being kept in a state of being attached to the compressing rollers 50a and 50b. Accordingly, a material thereof is preferably set to a material having a great friction coefficient with respect to the cord S so as to prevent a slip at a time of discharging, and an elastic material such as an urethane rubber or the like is preferably employed. Moreover, an outer diameter of the drawing rollers 52*a* and 52*b* is set slightly larger than an outer diameter of the compressing rollers 50*a* and 50*b*, and an outer surface of each of the drawing rollers 52*a* and 52*b* is formed in a smooth surface.

The rotation portion 14 is provided for rotating the compressing portion 22, and has a frame 70 fixed to a side portion of the frame 20, and a motor 72 attached to the frame 70.

A drive pulley 74 is attached to a rotating shaft 72*a* of the motor 72, and a belt 76 is wound between the drive pulley 74 and a driven pulley 40.

In the rotation portion 14, when driving the motor 72, a rotating force of the motor 72 is transmitted to the compressing portion 22 of the apparatus main body 12 via the drive pulley 74, the belt 76, the driven pulley 40 and the shaft body 38, and the compressing portion 22 and the slip ring 48 are rotated integrally. At this time, electricity supplied to the slip ring 48 from an external portion is supplied to the motor 56 via a conducting wire 49. Moreover, a rotating speed of the motor 72 may be appropriately set while taking into consideration a material of the long continuous material R or the like, and is set such as to twist the long continuous material R at 70 times per 1 m, in the present embodiment.

Figure 4:
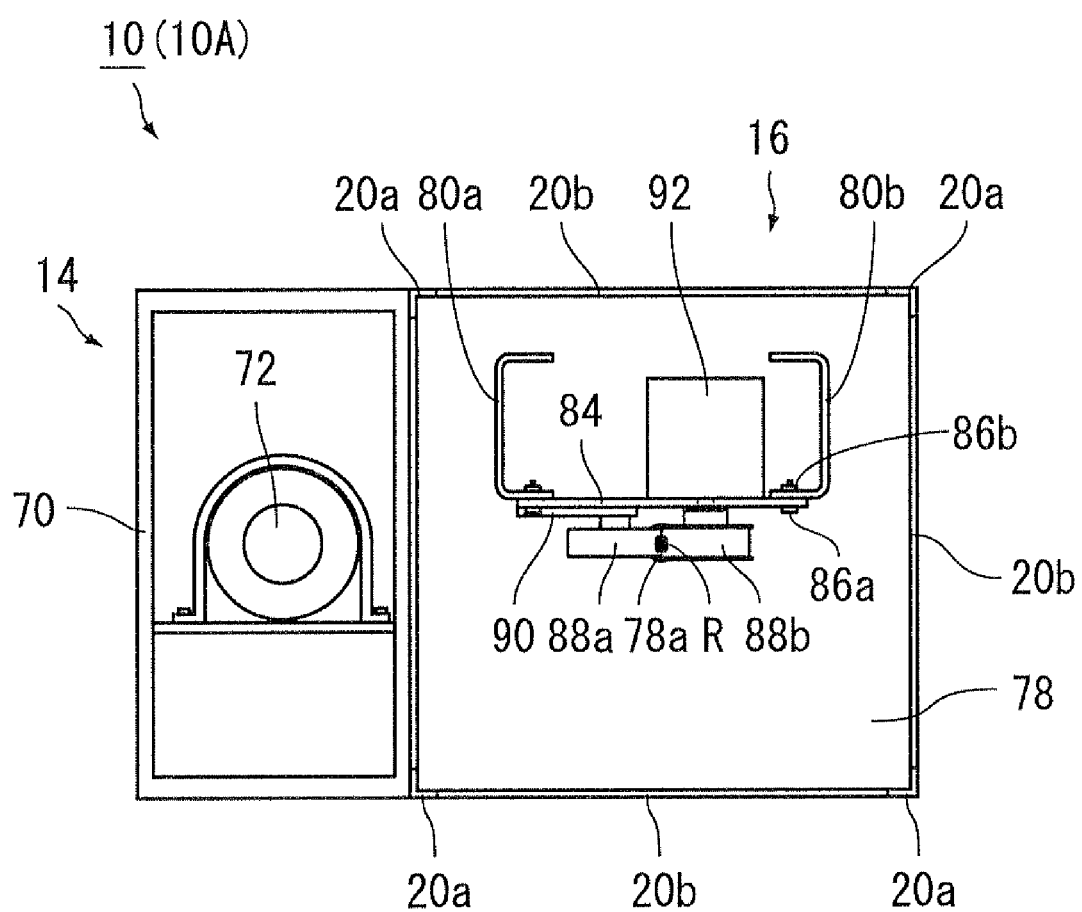
FIG. 4 is a top view showing a manufacturing apparatus of a cord.

The bunching portion 16 forms a cord-shaped bunched material R' by bunching the long continuous materials R drawn out from one or a plurality of long continuous wind-up bodies W to one (or a narrow width), corresponds to a portion forming a base point at a time of twisting the cord-shaped bunched material R', and has a rectangular base 78 mounted on the frame 20 of the apparatus main body 12, as is known from FIGS. 1 and 4. A hole 78*a* is formed in a center of the base 78, and a leading end of the shaft body 46 protruding to an upper side of the frame 20 is fitted to the hole 78*a*.

Two support columns 80*a* and 80*b* bent in an almost C-shaped cross sectional shape are provided in an upright position in an upper surface of the base 78 so as to be spaced at a predetermined interval, and a long hole 82 extending in a vertical direction is pierced in each of front surface sides thereof. A bunching roller fixing plate 84 is attached to a front surface (a surface in a side in which the long hole 82 is formed) of the support columns 80*a* and 80*b*. The bunching roller fixing plate 84 corresponds to a plate-shaped member constituted by a rigid material such as a metal or the like, and a round hole (not shown) is made in four corners. Further, it is possible to fix the bunching roller fixing plate 84 so as to freely adjust a position in a vertical direction with respect to the support columns 22*a* and 22*b*, by engaging a nut 86*b* with an end portion of a bolt 86*a* inserted to the round hole and the long hole 82 mentioned above.

A pair of bunching rollers 88*a* and 88*b* are attached to a front surface side of the bunching roller fixing plate 84.

In FIG. 1, one (the left side in FIG. 1) bunching roller 88*a* (in the movable side) is rotatably attached to a leading end of a position adjusting plate 90 attached so as to freely adjust a position in a lateral direction with respect to the bunching roller fixing plate 84. Further, the other (the right side in FIG. 1) bunching roller 88*b* (in the fixed side) is attached to the rotating shaft of the motor 92 attached to the bunching roller fixing plate 84. In this case, a rotating speed of the motor 92 is set in such a manner that a rotating speed of the bunching rollers 88*a* and 88*a* becomes slightly faster than a rotating speed of the compressing rollers 50*a* and 50*b*.

In this case, in each of the bunching rollers 88*a* and 88*b*, a material having a high friction coefficient with the long continuous material R is selected in such a manner as to prevent the slip from being generated at a time of discharging the long continuous material R to the lower side, and an elastic material such as an urethane rubber or the like is used in the present embodiment. In this case, the outer surfaces of the bunching rollers 88*a* and 88*b* are formed in a smooth surface.

Further, two long continuous material wind-up bodies W are arranged in the upper portion of the bunching rollers 88*a* and 88*b* so as to be spaced at a predetermined interval. In this case, the number of the long continuous material wind-up bodies may be appropriately set in correspondence to a thickness of the target cord S or the like, and may be set to one or three or more. Further, an arranged position of the long continuous material wind-up body W is not particularly limited, but for example, the long continuous material wind-up body W may be arranged just above or a side position of the bunching rollers 88*a* and 88*b*.

The cord recovery portion 18 corresponds to a portion for recovering the cord S formed in the apparatus main body 12, and an accommodating box 96 for accommodating the cord S is installed in a lower side of the shaft body 38, in the present embodiment.

Next, a description will be given of a method of manufacturing the cord S by using the cord manufacturing apparatus 10A in accordance with the present invention. When manufacturing the cord S by using the cord manufacturing apparatus 10A, a leading end of the long continuous material R is drawn out from the long continuous material wind-up body W. Further, the long continuous material R is set to a predetermined feeding path, and the leading end portion is pinched between the drawing rollers 52*a* and 52*b*.

Subsequently, the motor 92 of the bunching portion 16 and the motor 72 of the rotation portion 14 are driven. In this case, when the motor 72 is rotated, the rotating force of the motor 72 is transmitted to the compressing portion 22 via the drive pulley 74, the belt 76, the driven pulley 40 and the shaft body 38 as mentioned above, and the compressing portion 22 and the slip ring 48 are integrally rotated. The electric power is fed to the slip ring 48 via the feeding brush 48*a*, and is fed to the motor 56 via the conducting wire 49 derived from the slip ring 48. When all the motors 92, 72 and 56 are driven as mentioned above, the long continuous material R drawn from the long continuous wind-up body W is fed to the bunching rollers 88*a* and 88*b*.

In the bunching rollers 88*a* and 88*b*, two long continuous materials R are bunched to one in this case so as to form the cord-shaped bunched material R'. Further, the cord-shaped bunched material R' is twisted by a rotation of the compressing portion 22 from a moment of moving away from the bunching rollers 88*a* and 88*b* so as to be in a twist paper shaped wound state, and the formation of the twisted cord material R" is started from the bunching rollers 88*a* and 88*b* and the compressing rollers 50*a* and 50*b*.

In this case, the degree of twisting of the twist paper cord material R" is defined in accordance with a rotating speed of the compressing portion 22, and a loosened degree of the cord-shaped bunched material R' between the bunching rollers 88*a* and 88*b* and the compressing rollers 50*a* and 50*b*. Further, the rotating speed of the compressing portion 22 is defined in accordance with the rotating speed of the motor 72, and the loosened degree of the cord-shaped bunched material R' is defined in accordance with a speed difference between the rotating speed of the bunching rollers 88*a* and 88*b* and the rotating speed of the compressing rollers 50*a* and 50*b*.

The twist paper cord material R" twisted at a predetermined twisting degree and fed to the compressing portion 22 is point compressed by passing through the compressing rollers 50*a* and 50*b*.

In this case, since the dented portion is formed in the outer surfaces of the compressing rollers 50*a* and 50*b*, if the twist paper shaped cord material R" is point compressed by the compressing rollers 50a and 50b, the pressed indentations Y are formed on the surface of the cord S in correspondence to the uneven shape on the outer surfaces of the compressing rollers 50a and 50b so as to be spaced at a predetermined interval, and the layer of the long continuous material R constituting the twisted cord material R" is pressed together or fused or bonded to each other in accordance with the material thereof by the pressed indentations. In this case, as mentioned above, since the dented portion is formed on the outer surface of the disc-shaped member 58a constituting the compressing rollers 50a and 50b, and the slight gap is provided between the respective disc-shaped members 58a, the group of pressed indentations Y formed along a longitudinal direction of the surface cord S apply a design as if it is a spine.

Further, the cord S formed while passing through the compressing rollers 50a and 50b is discharged to the lower side by the drawing rollers 52a and 52b, and is recovered within the cord recovery portion 18.

In this case, if the twist paper shaped cord material R" is compressed by the compressing rollers 50a and 50b, a length of the cord S after passing through the compressing rollers 50a and 50b becomes slightly longer than the twist paper shaped cord material R". Accordingly, if the rotating speed of the drawing roller 52b is set slightly faster than the rotating speed of the compressing roller 50b, the cord S is not loosened between the compressing rollers 50a and 50b and the drawing rollers 52a and 52b. In this case, in the present embodiment, since the angular velocity is the same between the compressing roller 50b and the drawing roller 52b as mentioned above, the structure is achieved by setting the outer diameter of the drawing roller 52b slightly larger than the outer diameter of the compressing roller 50b.

In accordance with this embodiment, it is possible to securely extrude the air existing in the inner portion of the cord-shaped bunched material R' to the external portion, by twisting the cord-shaped bunched material R' in which one or a plurality of long continuous materials R are bunched to the narrow width (or one). Further, since the twist paper shaped cord material R" is structured as one thick and bunched band material, it is possible to obtain the cord S having a very high compression ratio and being durable, by point compressing the twist paper shaped cord material R".

Further, since the pressed indentations Y are formed on the outer surface of the cord S on the basis of the point compression by the compressing rollers 50a and 50b, the layers of the long continuous materials R constituting the cord S are crimped to each other. Accordingly, the cord S is neither swelled nor loosened. In this case, since the pressed indentations Y formed on the surface of the cord S functions as the slip resistance, the knot is not loosened at a time of binding the cord S.

In this case, in the embodiment mentioned above, the structure is made such that the long continuous material wind-up body W is formed by temporarily winding up the long continuous material R around the tube shaft X, and the long continuous material R is supplied to the manufacturing apparatus 10A by setting the long continuous material wind-up body W to the cord manufacturing apparatus 10, however, the structure may be made, for example, such that the long continuous material R sequentially discharged from a forming machine (not shown) is directly supplied to the manufacturing apparatus 10A, as shown by a broken line in FIG. 1. In this case, the rotating speeds of the bunching rollers 88a and 88b, the compressing rollers 50a and 50b and the drawing rollers 52a and 52b are appropriately set in correspondence to the supply speed of the long continuous material R in the forming machine (not shown).

Further, in the embodiment mentioned above, the structure is made such that the bunching portion 16 is provided with a pair of bunching rollers 88a and 88b, and the long continuous material wind-up body W arranged in the upper side of the bunching rollers 88a and 88b, however, the bunching portion 16 may be constituted, for example, by a structure in which the long continuous material wind-up body W is arranged in the side portion of the roller (not shown) installed in the upper side of the compressing portion 22. In this case, since the long continuous material R drawn out to the side portion from the long continuous material wind-up body W is changed in course by the rollers so as to be discharged to the lower compressing portion 22, a contact area between the long continuous material R and the roller becomes very large, and achieves both of the bunching function mentioned above in the contact portion, and a function of forming a base point of the twist.

Further, in the embodiment mentioned above, the structure is made such that the cord S discharged to the lower side from the drawing rollers 52a and 52b is recovered in the recovery box 96, however, the structure may be made such that the cord S discharged from the compressing rollers 50a and 50b is recovered while being directly wound up by a wind-up means (not shown) such as a wind-up roller or the like. In this case, since the cord S passing through the compressing rollers 50a and 50b is directly wound up by the wind-up means, the compressed cord S is not attached to the compressing rollers 50a and 50b. Accordingly, in this case, it is possible to omit the use of the drawing rollers 52a and 52b (in this case, in order to prevent the twist of the cord S from being returned to the original, it is preferable to rotate the wind-up means in synchronization with the compressing portion 22).

Further, the material of the long continuous material R is not limited to the synthetic resin, but may use a paper (a Japanese paper, a foreign paper or the like), a cloth (a natural fiber, a synthetic fiber, or a structure obtained by knitting or weaving a mixture thereof) or the like. The long continuous materials R constituted by the materials have only disposed conventionally, however, a new utility value can be found by recycling them as the cord S.

In this case, if the cord S manufacturing by the cord manufacturing apparatus 10A is cut at a predetermined interval, the pellet P can be formed. A description will be given below of a pellet manufacturing apparatus 100.

Figure 10:
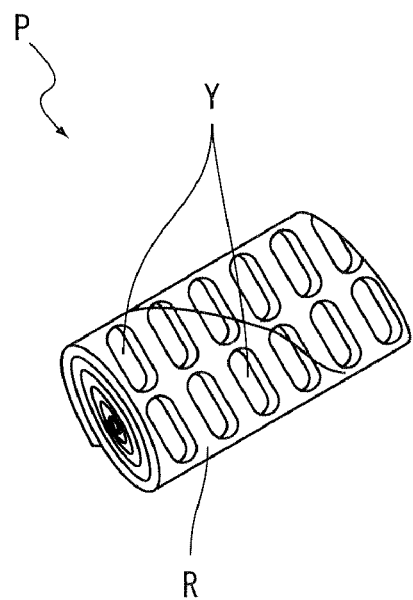
FIG. 10 is a perspective view showing the pellet.

In this case, the pellet P is structured such that the dented pressed indentations Y are formed on the outer surface of the laminated body of the long continuous material R in which the long continuous material R is spirally wound in a close contact state, as is known from FIG. 10.

Figure 8:
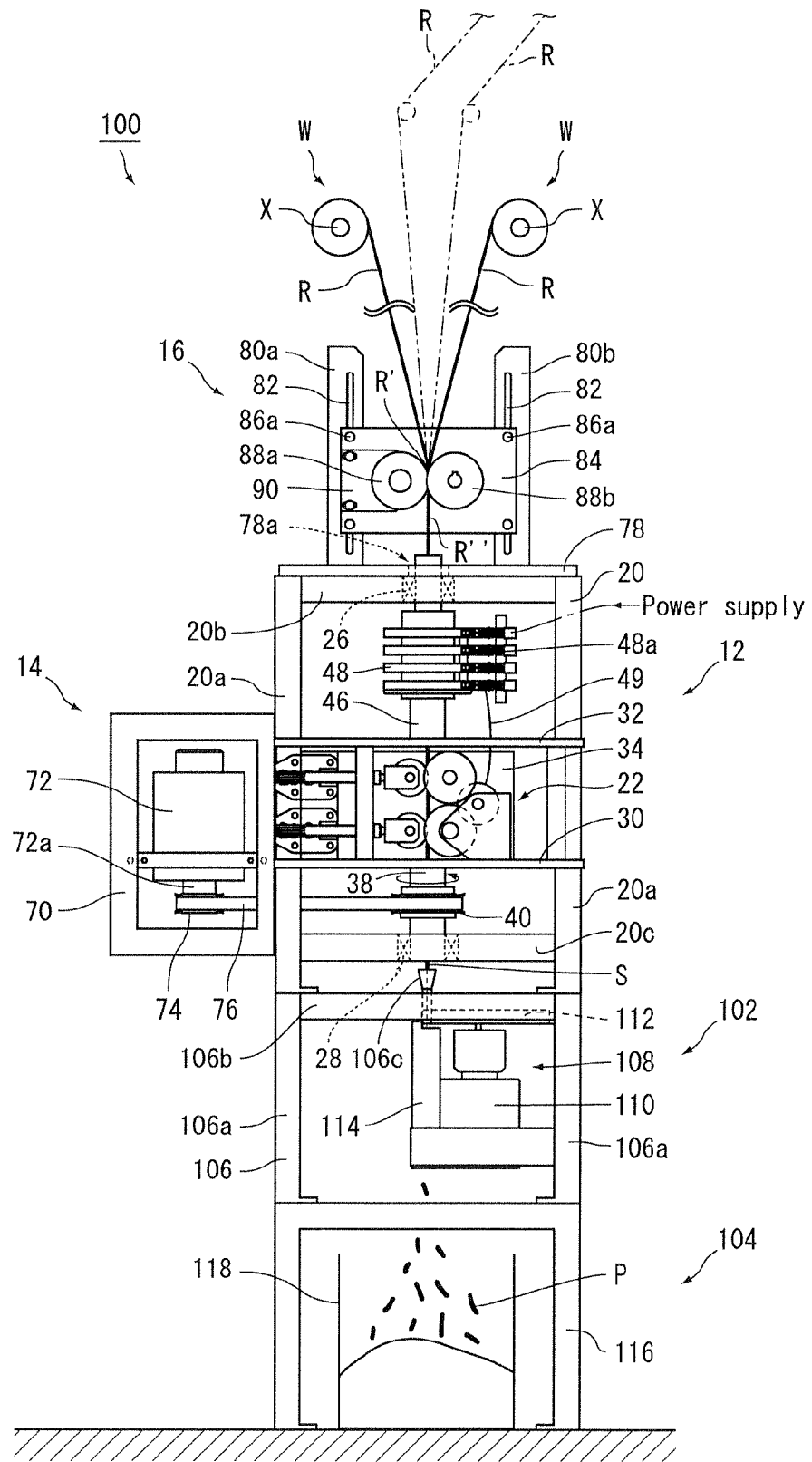
FIG. 8 is a front view showing a manufacturing apparatus of a pellet in accordance with the present invention.

The pellet manufacturing apparatus 100 is provided with the apparatus main body 12, the rotation portion 14, the bunching portion 16, a cutting portion 102 and a pellet recovery portion 104, as shown in FIG. 8.

In this case, the pellet manufacturing apparatus 100 in the present embodiment is provided with the cutting portion 102 and the pellet recovery portion 104 in place of the cord recovery portion 18 in the cord manufacturing apparatus 10A. However, a description will be given below only of the different portions, and the description mentioned above is applied to the structures of the consistent portions.

The cutting portion 102 is constituted by a frame 106 and a cutting portion 108. The frame 106 corresponds to a portion forming a skeleton of the cutting portion 102, and is provided with a plurality of (four in the present embodiment) support columns 106a formed by an elongated rod-like member (for example, an L-shaped steel), and an upper plate 106b provided in an upper end portion of the support column 106a. A hole (not shown) is formed in a center portion of the upper plate 106b in conformity to a position where the cord S is discharged, and a tubular guide member 106c guiding the cord s to the cutting portion 108 is formed in an upper surface of the upper plate 106b and in the periphery of the hole.

Figure 9:
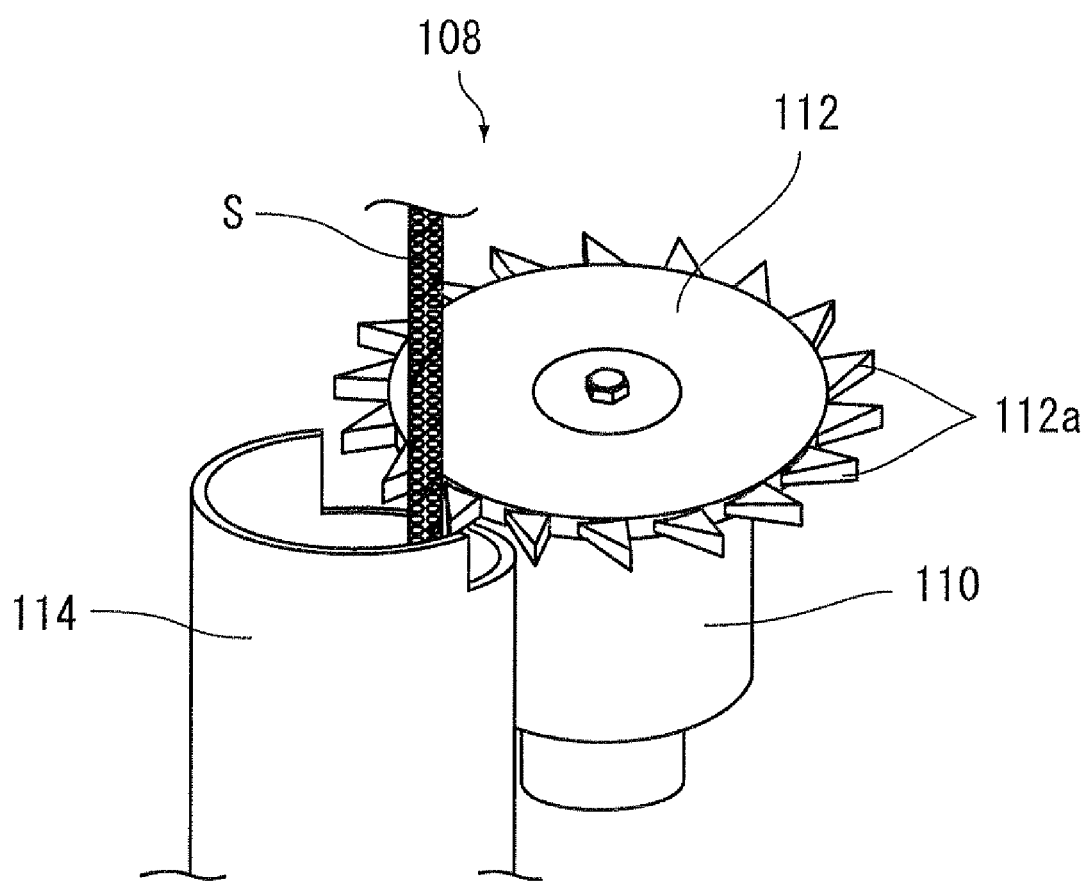
FIG. 9 is a (partly omitted) perspective view showing a cutting portion.

The cutting portion 108 is mainly constituted by a motor 110 fixed to the support column 106a, a cutter 112 attached to a rotating shaft of the motor 110, and a guide 114 guiding the pellet P cut by the cutter 112 to the pellet recovery portion 104, as is known from FIG. 9.

The cutter 112 is constituted by an almost disc-shaped member made by a rigid material such as a metal or the like, and a plurality of blades 112a are formed in an outer surface so as to be spaced at a predetermined interval, as shown in FIG. 9. In this case, the number of the blades 112a and the interval between the blades 112a are appropriately set in correspondence to a size of the target pellet P while taking into consideration a discharging speed of the cord S, a rotating speed of the cutter 112 and the like.

The guide 114 is attached to a side position of the motor 110. The guide 114 is constituted by an almost cylindrical member, and a notch is formed in an upper end portion thereof. Further, a position, a size and the like of the notch portion are appropriately set in such a manner that the blade 112a of the cutter 112 can pass through the notch portion.

Figure 11:
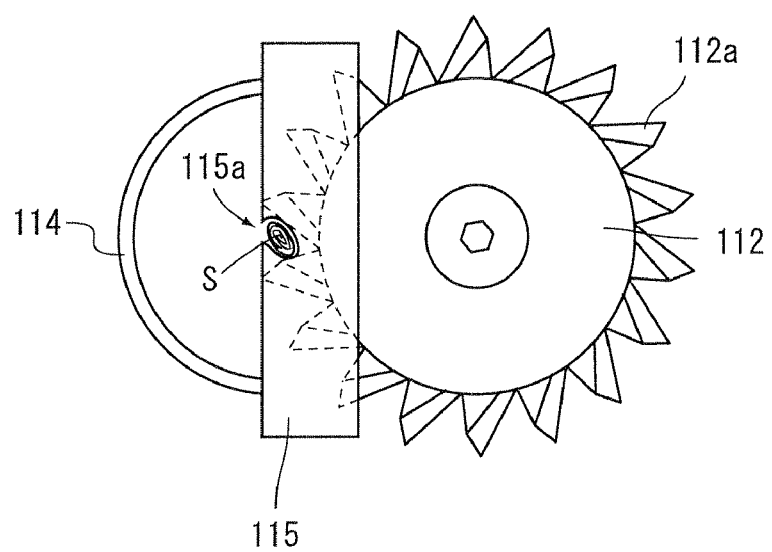
FIG. 11 is a figure showing a modified embodiment of the cutting portion.

In this case, a cord fixing member 115 may be provided in an upper end portion of the guide 114 as shown in FIG. 11. The cord fixing member 115 is constituted by a plate-shaped member made of a rigid material such as a metal or the like, and an elongated notch 115a having such a size that the cord S can pass through is formed in an end portion thereof (the notch portion 115a extends toward a rotating direction of the cutter 112).

The pellet recovery portion 104 corresponds to a portion recovering the pellet P guided from the guide 114, and is structured in the present embodiment such that a recovery box 118 is installed within a frame 116 placed in a lower side of the cutting portion 102.

Next, a description will be given of a method of manufacturing the pellet P by using the pellet manufacturing apparatus 100 in accordance with the present invention.

In the pellet manufacturing apparatus 100, the motor 110 of the cutting portion 108 is driven in addition to the motor 92 of the bunching portion 16 and the motor 72 of the rotation portion 14. Accordingly, the cutter 112 is rotated at a predetermined rotating speed.

When the cord S discharged from the drawing rollers 52a and 52b is derived to the portion near the cutter 112 after passing through the guide member 106c, the cord S is continuously cut to a predetermined length on the basis of the rotation of the cutter 112, whereby the pellet P is formed (since the cord S is pinched between the blade 112a of the cutter 112 and the notch 115a of the cord fixing member 115 and the position thereof is fixed in the case that the cord fixing portion 115 is provided in the upper end portion of the guide 114, it is possible to more securely cut the cord S). In this case, a length in an axial direction of the pellet P can be freely adjusted by appropriately adjusting the rotating speed of the cutter 112 and the feeding speed of the cord S.

The cut pellet P is recovered to the recovery box 118 after passing through the guide 114.

In accordance with the present embodiment, it is possible to extrude the air existing in the inner portion of the cord-shaped bunched material R' to the external portion by twisting the cord-shaped bunched material R' obtained by bundling one or a plurality of long continuous materials R to one. Further, since the twisted cord material R" obtained thereby is structured as one thick and bunched band material, it is possible to obtain the pellet P having a very high compression ratio and a great apparent specific gravity by compressing the twisted cord material R". In this case, since the thickness of the twisted cord material R" becomes uniform to some extent by making the twisting number of the cord-shaped bunched material R' constant, the value of the apparent specific gravity of the pellet P becomes uniform.

Further, the pressed indentations Y are formed on the outer surface of the pellet P by being compressed by the compressing rollers 50a and 50b, however, since the pressed indentations Y can press together the layers of the long continuous materials R constituting the pellet P to each other, the pellet P is neither swelled nor loosened, and it is possible to keep the shape over a long period.

Further, since the obtained pellet P is compressed by the pressed indentations Y portion so as to become in a dense state, a base material strength is very high.

Further, in the present embodiment, since the conventional heating step is not necessary for forming the pellet P, a quality deterioration of the pellet P caused by the heating is not generated.

Further, in the case that the long continuous materials R are constituted by the disposal facilities, it has been conventionally hard to dispose the bulky long continuous materials R, however, the bulk of the entire of the disposal facilities can be made smaller by changing them to the cords or the pellets. Accordingly, it is possible to achieve a volume reduction and a power saving at a time of disposing.

In this case, commonly applied to the cord manufacturing apparatus 10 and the pellet manufacturing apparatus 100, the structure may be made such that the compressing portion 22 is fixed and the bunching portion 16 is rotated with respect to the compressing portion 22 (mentioned below), in place of the structure that the compressing portion 22 is rotated with respect to the bunching portion 16. Further, the structure may be made such that the bunching portion 16 and the compressing portion 22 are simultaneously rotated in the different directions (in other words, the bunching portion 16 and the compressing portion 22 can be relatively rotated).

Embodiment 2

A cord manufacturing apparatus 10B in accordance with a second embodiment is structured such that the compressing portion is fixed, and the bunching portion is rotated with respect to the compressing portion.

Figure 12:
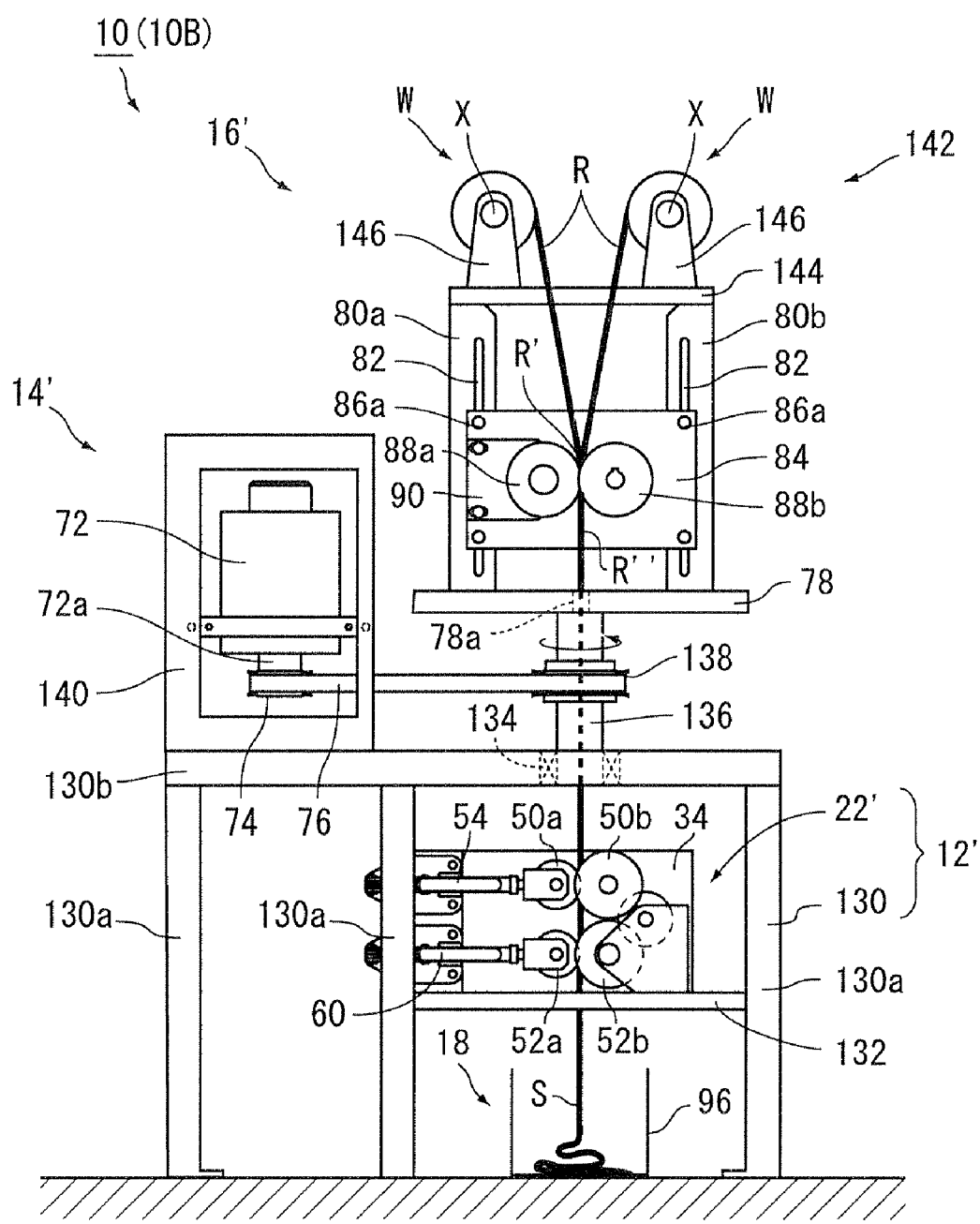
FIG. 12 is a front view showing a manufacturing apparatus of a cord in accordance with a second embodiment of the present invention.

The cord manufacturing apparatus 10B is provided with an apparatus main body 12', a rotation portion 14', a bunching portion 16' and a cord recovery portion 18, as shown in FIG. 12.

The apparatus main body 12' is constituted by a frame 130 and a compressing portion 22'.

The frame 130 has six support columns 130a, and an upper plate 130b provided in an upper end portion of the support columns 130a, and a bearing member 134 is fixed to an upper surface of the upper plate 130b.

The compressing portion 22' has a fixed plate 132 attached to a middle stage portion of the frame 130, and a roller mounting plate 34 provided in an upright position in an upper surface of the fixed plate 132. In this case, the roller mounting plate 34 is provided with the compressing rollers 50a and 50b, the drawing rollers 52a and 52b, the motor 56 and the like, as mentioned above (refer to FIG. 3).

The rotation portion 14' has a frame 140 fixed to a side position of an upper end portion of the frame 130, and a motor 72 attached to the frame 140.

The bunching portion 16' has almost the same structure as the bunching portion 16 in accordance with the first embodiment, however, is different in a point that a shaft body 136 is provided in a lower surface of a base 78, and a long continuous material wind-up body holding portion 142 is provided in upper end portions of the support columns 80a and 80b.

A tubular shaft body 136 having an almost equal inner diameter to an inner diameter of a hole 78a provided in a center of the base 78 is attached to a lower surface side of the base 78 adjusted to a position of the hole 78a, and a lower end portion of the shaft body 136 is rotatably supported to the bearing member 134. In this case, a driven pulley 138 is integrally provided in a middle portion of the shaft body 136, and a belt 76 is wound between the driven pulley 138 and the drive pulley 74.

The long continuous material wind-up body holding portion 142 is provided for holding the long continuous material wind-up body W, and is provided with a base 144 attached to the upper end portions of the support columns 80a and 80b, and plural sets of (two sets in the present embodiment, however, three or more sets or one set may be employed) mounting members 146 provided in a upright position on an upper surface of the base 144.

In this case, the cord recovery portion 18 is arranged in a lower side of the compressing portion 22'.

When manufacturing the cord S by using the cord manufacturing apparatus 10B in accordance with the present embodiment, the leading end of the long continuous material R is drawn out from the long continuous material wind-up body W held in the long continuous material wind-up body holding portion 142. Further, the long continuous material R is set to a predetermined feeding path, the leading end portion thereof is pinched between the drawing rollers 52a and 52b, and all the motors 92, 72 and 56 are thereafter activated in the same manner as the first embodiment.

In this case, when the motor 72 of the rotation portion 14' is activated, the rotating force of the motor 72 is transmitted to the bunching portion 16' via the drive pulley 74, the belt 76, the driven pulley 138 and the shaft body 136, and the bunching portion 16' is rotated with respect to the apparatus main body 12' (in more detail, the compressing portion 22').

Two long continuous materials R drawn out from the long continuous material wind-up body W are bunched to one by the bunching rollers 88a and 88b, whereby the cord-shaped bunched material R' is formed. Further, the cord-shaped bunched material R' is twisted on the basis of the rotation of the bunching portion 16' from a moment when the cord-shaped bunched material R' is detached from the bunching rollers 88a and 88b so as to be in the twist paper shaped wound state, and the formation of the twisted cord material R" is started between the bunching rollers 88a and 88b and the compressing rollers 50a and 50b.

Further, the twisted cord material R" is point compressed by the compressing rollers 50a and 50b and the cord S is formed, however, since this point is the same as the first embodiment mentioned above, a description thereof will be omitted.

Since the cord S is also formed by the twisting step and the compressing step in accordance with this embodiment, it is possible to obtain the durable cord S having the very high compression ratio in the same manner as the first embodiment.

Embodiment 3

Figure 13:
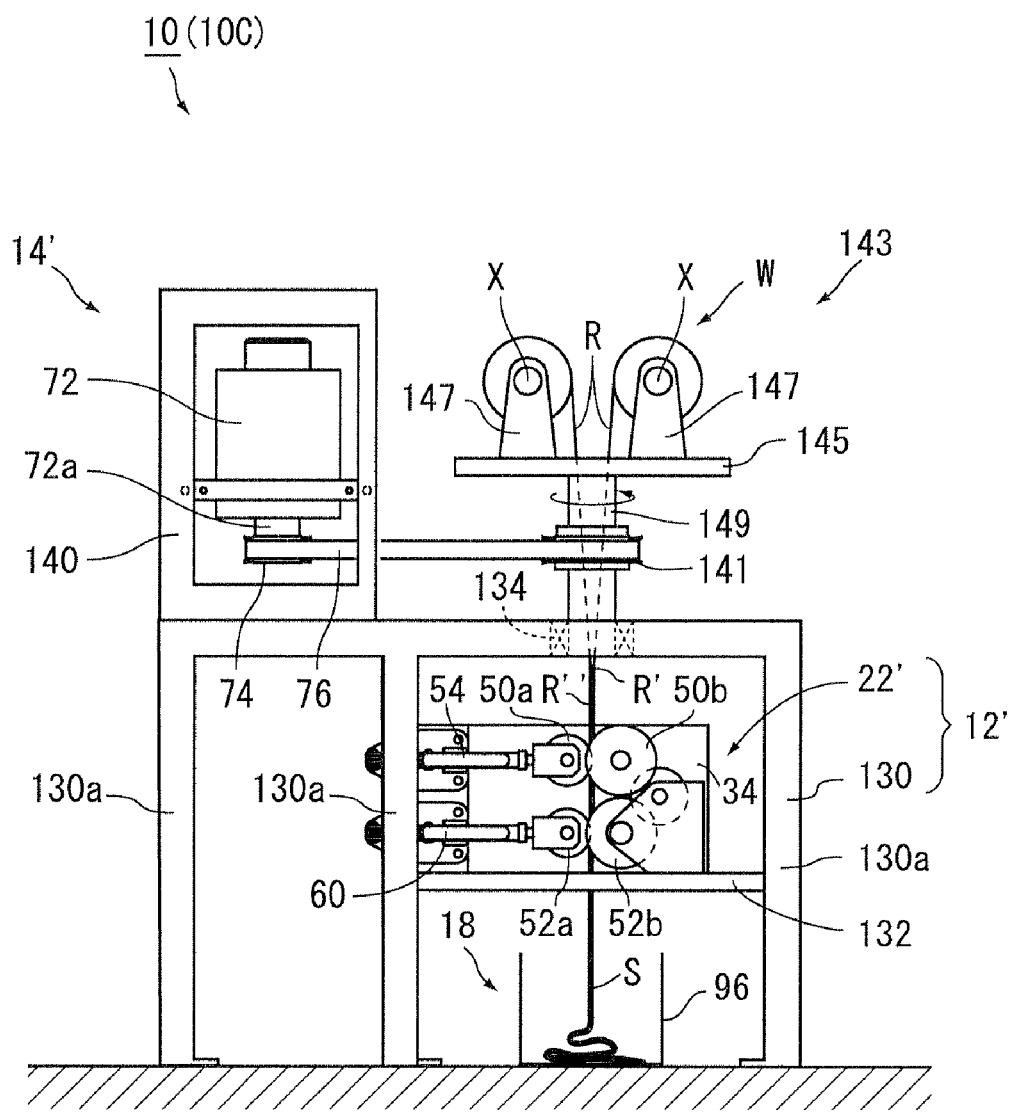
FIG. 13 is a front view showing a manufacturing apparatus of a cord in accordance with a third embodiment of the present invention.

A cord manufacturing apparatus 10C in accordance with a third embodiment corresponds to a modified embodiment (an embodiment provided with no bunching roller) of the second embodiment mentioned above, and is provided with the apparatus main body 12', the rotation portion 14', a long continuous material wind-up body holding portion 143 and the cord recovery portion 18 as shown in FIG. 13.

The long continuous material wind-up body holding portion 143 is provided for holding the long continuous material wind-up body W, and is provided with a base 145, and plural sets of (two sets in the present embodiment, however, three or more sets or one set may be employed) mounting members 147 provided in an upright position on an upper surface of the base 145. A cylindrical shaft body 149 is attached to a lower surface side of the base 145, and a lower end portion of the shaft body 149 is rotatably supported to the bearing member 134 of the frame 130. In this case, the driven pulley 141 is integrally provided in a middle stage portion of the shaft body 149, and the belt 76 is wound between the driven pulley 141 and the drive pulley 74.

When manufacturing the cord S by using the cord manufacturing apparatus 10C in accordance with the present embodiment, the leading end of the long continuous material R is drawn out from the long continuous material wind-up body W held in the long continuous material wind-up body holding portion 143. Further, the long continuous material R is set to a predetermined feeding path, the leading end portion thereof is pinched between the drawing rollers 52a and 52b, and the motors 72 and 56 are thereafter activated.

In this case, when the motor 72 of the rotation portion 14' is activated, the rotating force of the motor 72 is transmitted to the long continuous material wind-up body holding portion 143 via the drive pulley 74, the belt 76, the driven pulley 141 and the shaft body 149, and the long continuous material wind-up body W held in the long continuous material wind-up body holding portion 143 is rotated with respect to the apparatus main body 12' (in more detail, the compressing portion 22').

Two long continuous materials R drawn out from the long continuous material wind-up body W are bunched to one by the compressing rollers 50a and 50b, as is different from the embodiment mentioned above, whereby the cord-shaped bunched material R' is formed, and the long continuous materials R are twisted on the basis of the rotation of the cord-shaped bunched material R' so as to be in the twisted wound state. Then, the formation of the twist paper shaped cord material R" is started between the long continuous material wind-up body W and the compressing rollers 50a and 50b.

Further, the twisted cord material R" is point compressed by the compressing rollers 50a and 50b and the cord S is formed, however, since this point is the same as the embodiment mentioned above, a description thereof will be omitted.

Since the cord S is also formed by the twisting step and the compressing step in accordance with this embodiment, it is possible to obtain the durable cord S having the very high compression ratio in the same manner as the embodiment mentioned above.

Embodiment 4

A cord manufacturing apparatus 10D in accordance with a fourth embodiment is structured such that the long continuous material R is obtained in a state in which the bunching portion and the compressing portion are fixed, as is different from the embodiment mentioned above.

Figure 14:
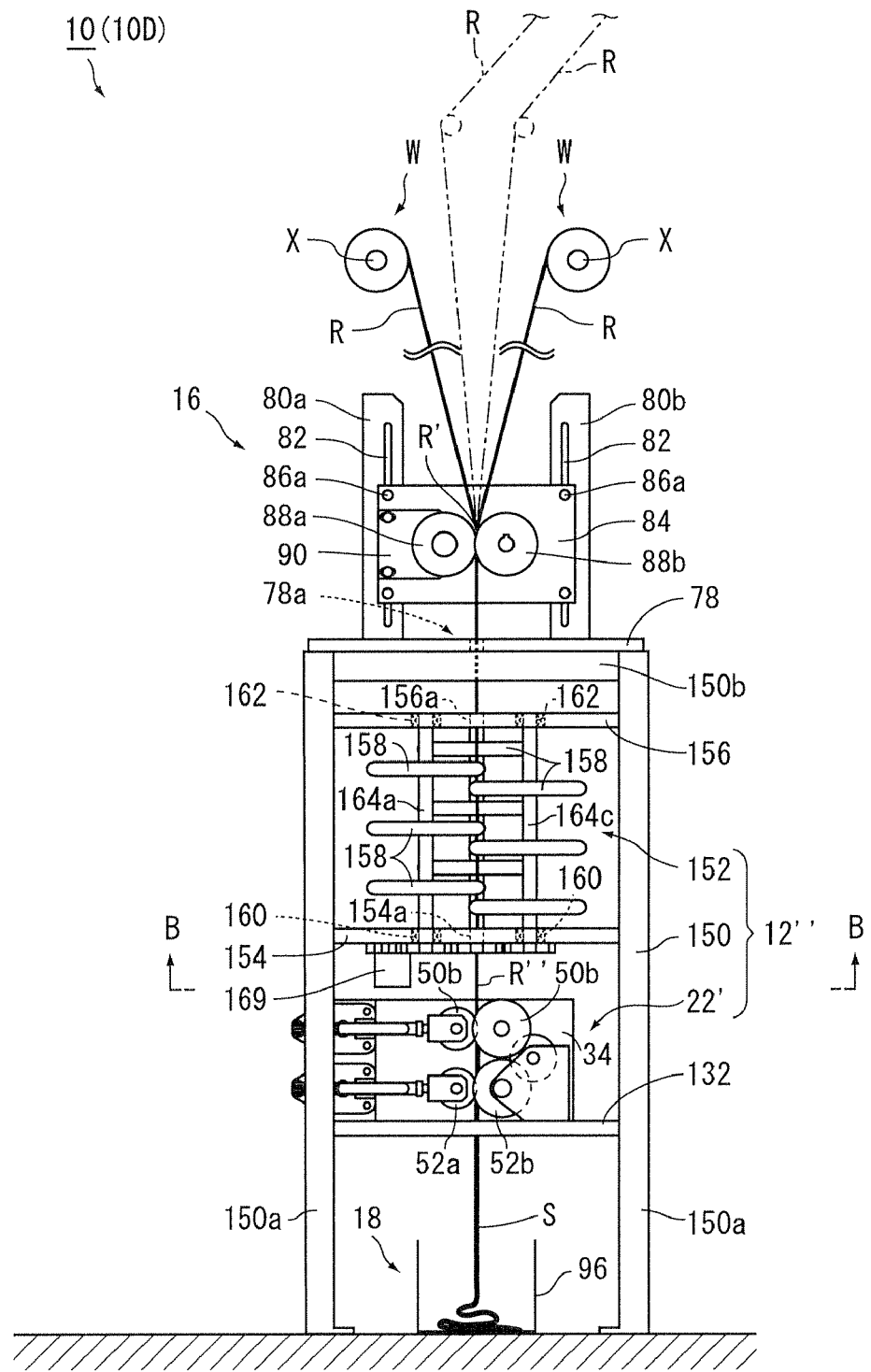
FIG. 14 is a front view showing a manufacturing apparatus of a cord in accordance with a fourth embodiment of the present invention.

The cord manufacturing apparatus 10D is provided with an apparatus main body 12", the bunching portion 16 and the cord recovery portion 18, as shown in FIG. 14.

The apparatus main body 12" is constituted by a frame 150, the compressing portion 22' and a twist forming portion 152. The frame 150 is provided with a plurality of (four in the present embodiment) support columns 150a, and an upper plate 150b provided in an upper end portion of the support columns 150a.

The twist forming portion 152 has a lower table 154, an upper table 156 and a plurality of (nine in the present embodiment) twisting rollers 158.

The lower table 154 corresponds to a rectangular member attached to the frame 150, a hole 154a for inserting the twisted cord material R" thereto is formed in a center thereof, and a plurality of (three in the present embodiment) bearing members 160 are fixed to the periphery of the hole 154a at a uniform angular interval.

The upper table 156 corresponds to a rectangular member formed at an almost equal size to the lower table 154, a hole 156a is formed in a center thereof, and three bearing members 162 are fixed to the periphery of the hole 156a in conformity to the positions of the bearing members 160 mentioned above.

Further, shaft bodies 164a to 164c are rotatably supported to the respective bearing members 160 of the lower table 154, and upper end portions of the shaft bodies 164a to 164c are rotatably supported to he bearing members 162 of the upper table 156, respectively.

A plurality of (three in the present embodiment) twisting rollers 158 are attached to the respective shaft bodies 164a to 164c so as to be spaced at a predetermined interval. Each of the twisting rollers 158 is constituted by a disc member, and a member (for example, an elastic member such as an urethane rubber or the like) having a high friction coefficient with the long continuous material R is stuck to an outer surface thereof over an entire periphery.

Figure 15:
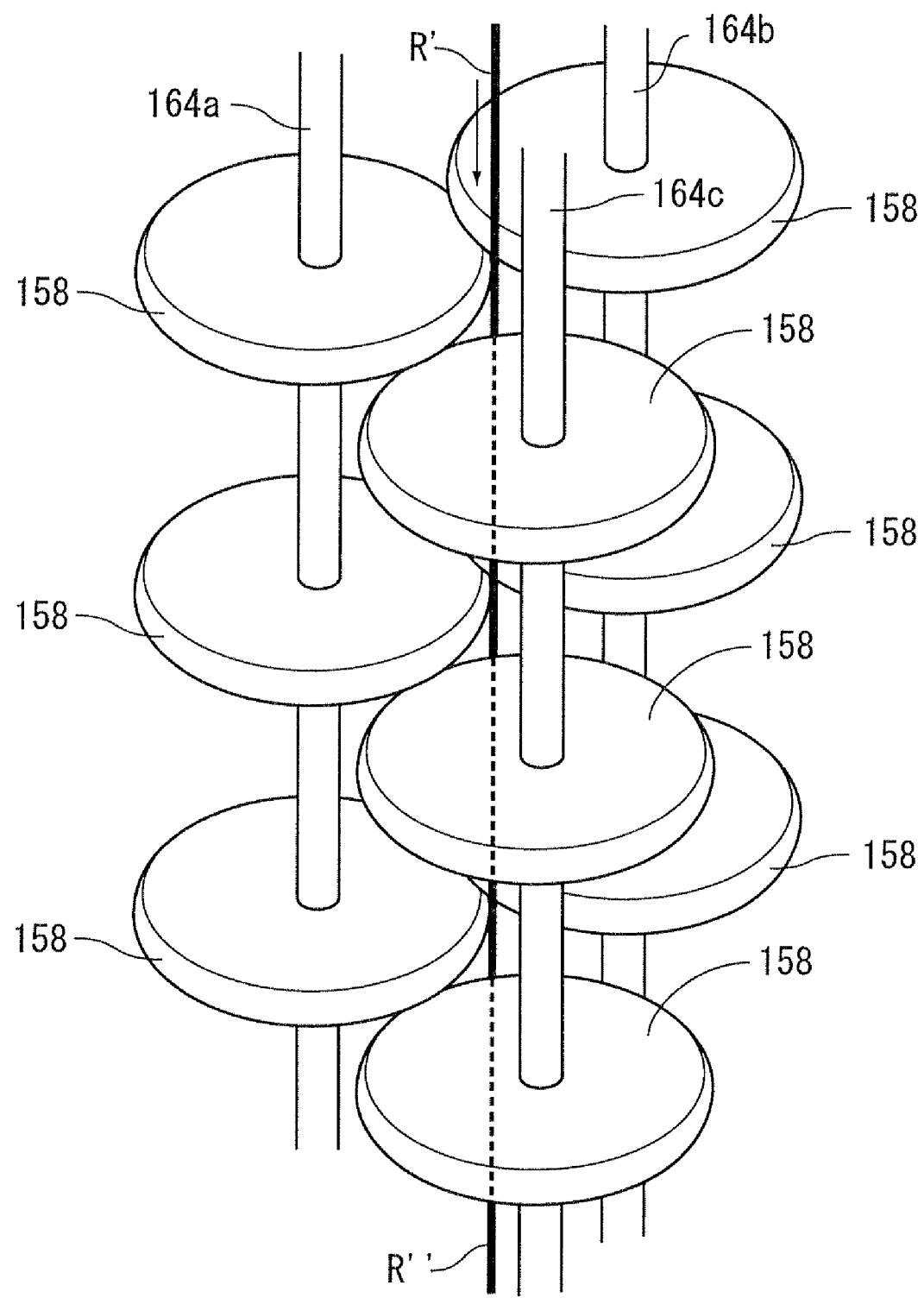
FIG. 15 is a perspective view showing a twist forming portion in the embodiment shown in FIG. 14.

In this case, viewed as a whole of the twist forming portion 152, the twisting rollers 158 are spirally arranged in the periphery of the cord-shaped bunched material R' at a predetermined interval in such a manner that the outer surface is brought into contact with the cord-shaped bunched material R', as is known from FIG. 15.

Figure 16:
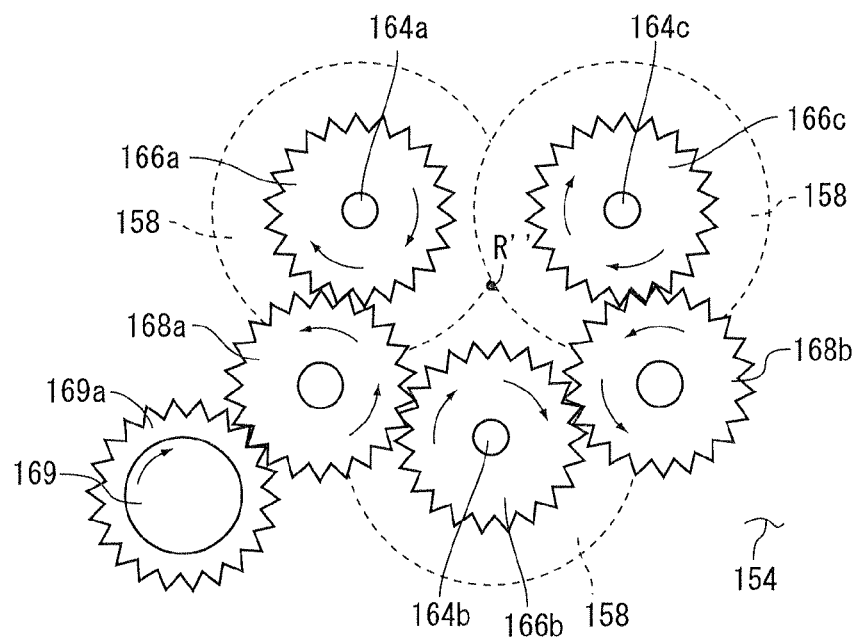
FIG. 16 is a (partly omitted) sectional view along a line B-B in FIG. 15.

Gears 166a to 166c are respectively attached to lower end portions of the shaft bodies 164a to 164c, as shown in FIG. 16. In this case, each of the gear 166a and the gear 166b is engaged with an intermediate gear 168a, and a gear 169a attached to a rotating shaft of a motor 169 is engaged with the intermediate gear 168a. On the other hand, each of the gear 166b and the gear 166c is engaged with an intermediate gear 168b.

When driving the motor 169 in the twist forming portion 152, a rotating force of the motor 169 is transmitted to the gears 166a to 166c via the intermediate gears 168a and 168b, and all the twisting rollers 158 attached to the respective shaft bodies 164a to 164c are rotated in the same direction.

The bunching portion 16 is arranged in the upper portion of the frame 150 constituting the apparatus main body 12", and the cord recovery portion 18 is arranged in the lower side of the compressing portion 22'.

When manufacturing the cord S by using the cord manufacturing apparatus 10D in accordance with the present embodiment, the leading end of the long continuous material R is drawn out from the long continuous material wind-up body W in the same manner as mentioned above, and the long continuous material R is set to the predetermined feeding path. Further, the leading end portion of the long continuous material R is pinched between the drawing rollers 52a and 52b, and the motors 92, 56 and 169 are thereafter activated.

In this case, when the motor 169 is activated, the rotating force of the motor 169 is transmitted to the gears 166a to 166c via the intermediate gears 168a and 168b, and all the twisting rollers 158 attached to the respective shaft bodies 164a to 164c are rotated in the same direction.

The long continuous materials R drawn out from the long continuous material wind-up body W are bunched to one in the bunching portion 16, whereby the cord-shaped bunched material R' is formed. Further, when the cord-shaped bunched material R' passes through the twist forming portion 152, the cord-shaped bunched material R' is twisted by nine twisting rollers 158 rotating in the same direction, and the twisted cord material R" is formed.

In this case, the twisting degree of the twisted cord material R" is appropriately defined in correspondence to the installation number of the twisting rollers 158 and the rotating speed thereof.

The twisted cord material R" twisted at the predetermined twisting degree and fed to the compressing portion 22' is point compressed by passing through the compressing rollers 50a and 50b and the cord S is formed, however, this point is the same as mentioned above.

Further, since the cord S is also formed by the twisting step by the twist forming portion 152, and the compressing step by the compressing portion 22' in accordance with this embodiment, it is possible to obtain the durable cord S having the very high compression ratio in the same manner as the embodiment mentioned above.

Embodiment 5

Figure 17:
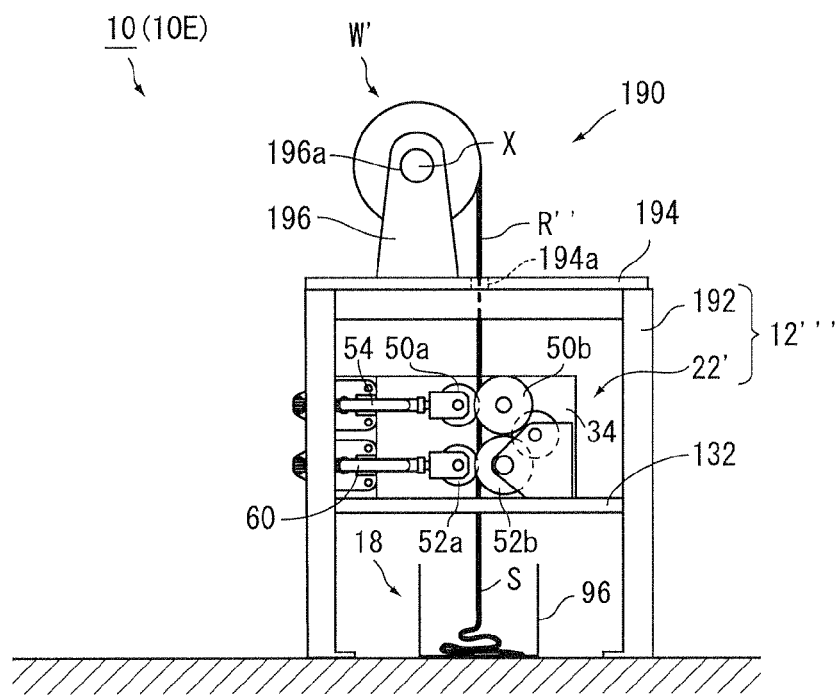
FIG. 17 is a front view showing a manufacturing apparatus of a cord in accordance with a fifth embodiment of the present invention.

A cord manufacturing apparatus 10E in accordance with a fifth embodiment shown in FIG. 17 is different from the cord manufacturing apparatuses 10A to 10D in accordance with the embodiments mentioned above in which the long continuous material R is used as the raw material, and is structured such as to form the cord S by using the previously twisted cord material R" as the raw material and point compressing it. In this case, in order to manufacture the cord S by using the cord manufacturing apparatus 10E in accordance with the present embodiment, it is necessary to previously form the twisted cord material R" serving as the raw material. Accordingly, a description is first given below of a manufacturing apparatus 170 of a twisted cord material, and a description will be later given of the cord manufacturing apparatus 10E.

Figure 18:
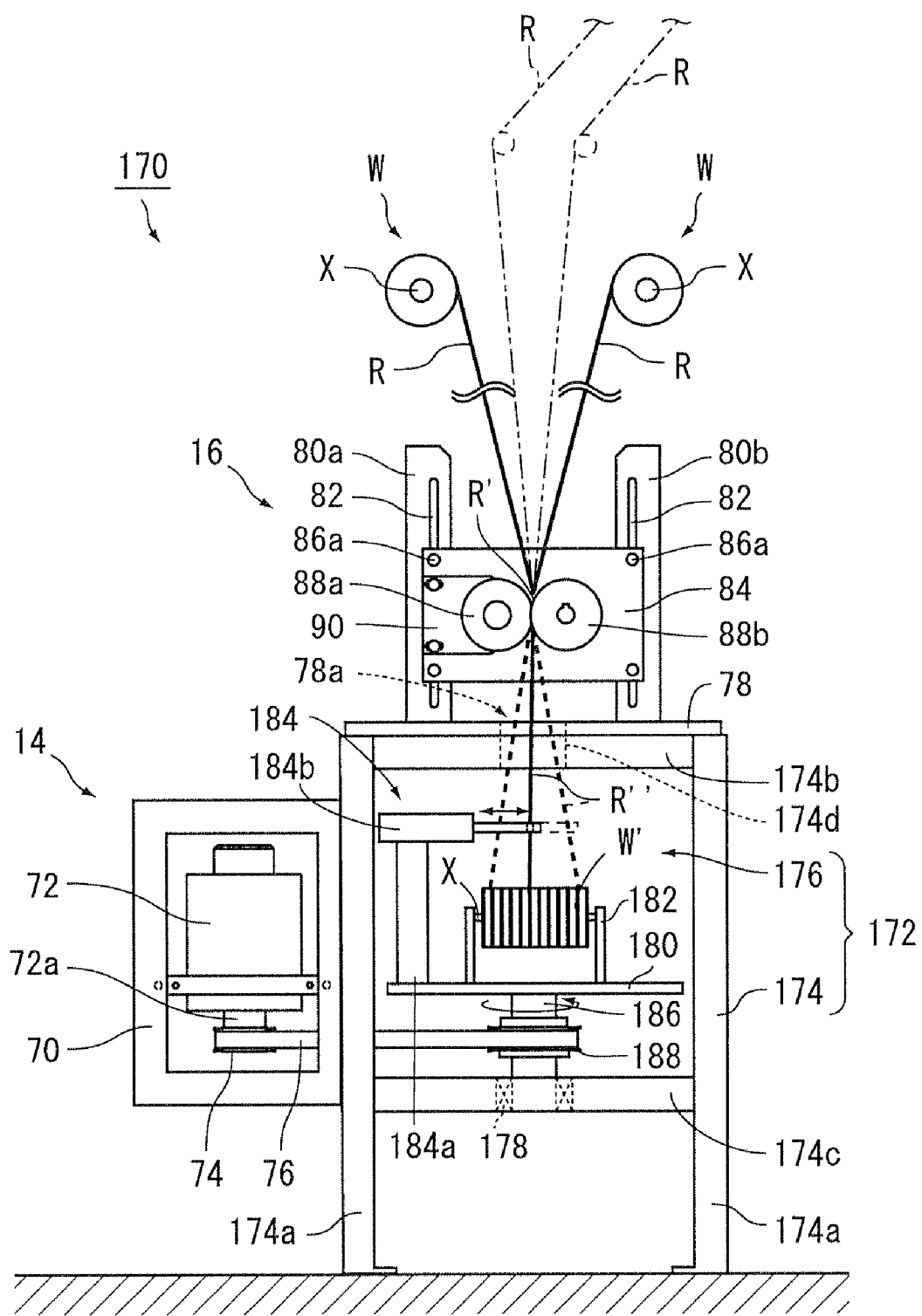
FIG. 18 is a front view showing a manufacturing apparatus of a twist paper shaped cord material.

The twisted cord material manufacturing apparatus 170 is provided with an apparatus main body 172, the rotation portion 14 and the bunching portion 16, as shown in FIG. 18.

The apparatus main body 172 is provided with a frame 174 and a wing-up portion 176. The frame 174 is provided with a plurality of (four in the present embodiment) support columns 174a, an upper plate 174a provided in upper end portions of the support columns 174, and a lower plate 174c provided in a middle stage portion of the support columns 174a. Further, a hole 174d for inserting the cord-shaped bunched material R' thereto is formed in a center portion of the upper plate 174b, and a bearing member 178 is fixed to a center portion of the lower plate 174c.

The wind-up portion 176 has a table 180, a wind-up roller 182 and a guide 184.

The table 180 is constituted by a disc-shaped member, a shaft body 186 is attached to a center portion in a lower surface side thereof, and a lower end portion of the shaft body 186 is rotatably supported to the bearing member 178. In this case, a driven pulley 188 is integrally provided in a middle stage portion of the shaft body 186.

The wind-up roller 182 and the guide 184 are provided in the upper surface of the table 180. The guide 184 is provided for winding up the twisted cord material R" around the wind-up roller 182 in multiple rows and multiple stages, and is constituted by a support column 180a provided in an upright position on the upper surface of the table 180, and a guide member 184b provided in the upper end portion of the support column 180a and reciprocating in a parallel direction to the wind-up shaft of the wind-up roller 182. In the case that the twisted cord material R" is wound around the wind-up roller 182 in one row and multiple stages, the installation of the guide 184 can be omitted.

The rotation portion 14 is provided in a side position of the apparatus main body 172, and the bunching portion 16 is provided in an upper portion of the apparatus main body 172. In this case, the belt 76 is wound between the drive pulley 74 of the rotation portion 14 and the driven pulley 188.

When manufacturing the twisted cord material R" by using the twisted cord material manufacturing apparatus 170, the leading end of the long continuous material R is drawn out from the long continuous material wind-up body W. Further, the long continuous material R is set to a predetermined feeding path, the leading end of the long continuous material R is locked to the wind-up roller 182, the wind-up roller 182 is rotated, and the motor 72 of the rotation portion 14 and the motor 92 of the bunching portion 16 are rotated.

When the motor 72 of the rotation portion 14 is rotated, the rotating force of the motor 72 is transmitted to the wind-up portion 176 via the drive pulley 74, the belt 76, the driven pulley 188 and the shaft body 186, and the wind-up portion 176 is rotated with respect to the bunching portion 16.

Two long continuous materials R drawn out from the long continuous material wind-up body W (or directly derived from a forming machine (not shown) as shown by a two-dot chain line) are bunched to one by the bunching rollers 88a and 88b, whereby the cord-shaped bunched material R' is formed. Further, the cord-shaped bunched material R' is twisted on the basis of the rotation of the wind-up portion 176 from a moment when the cord-shaped bunched material R' is detached from the bunching rollers 88a and 88b, and the twisted cord material R" is formed. Further, the twisted cord material R" is wound around the tube shaft X of the wind-up roller 182, whereby a twist paper shaped cord material wind-up body W' is formed, and the twisted cord material wind-up body W' is set to the cord manufacturing apparatus 10E mentioned below.

Next, a description will be given of the cord manufacturing apparatus 10E in accordance with the present embodiment. The cord manufacturing apparatus 10E is provided with an apparatus main body 12''', a twisted cord material wind-up body holding portion 190 and the cord recovery portion 18, as shown in FIG. 17.

The apparatus main body 12''' is constituted by a frame 192 and a compressing portion 22' provided in a middle stage portion of the frame 192.

The twisted cord material wind-up body holding portion 190 is provided in an upper portion of the apparatus main body 12'''. The twisted cord material wind-up body holding portion 190 has a plate 194, and a pair of support plates 196 provided in an upright position on an upper surface of the plate 194. A hole 194a for inserting the twisted cord material R" thereto is formed in a center of the plate 194, and a support hole 196a is formed in a pair of support plates 196. Further, the tube shaft X of the twisted cord material wind-up body W' is rotatably attached to the support hole 196a.

When manufacturing the cord S by using the cord manufacturing apparatus 10E in accordance with the present embodiment, the leading end of the twisted cord material R" is drawn out from the twisted cord material wind-up body W'. Further, the twisted cord material R" is set to a predetermined feeding path, and the leading end portion thereof is pinched between the drawing rollers 52a and 52b.

Subsequently, when the motor 56 of the compressing portion 22' is activated, the twisted cord material R" is fed to the compressing rollers 50a and 50b, and the twisted cord material R" is point compressed by the compressing rollers 50a and 50b in the same manner as mentioned above, whereby the cord S is formed.

In this embodiment, since the cord S is formed by compressing the twist paper shaped cord material R" previously twisted in the twist paper shape, it is possible to make the structure of the entire of the apparatus very simple in comparison with the cord manufacturing apparatuses in accordance with the embodiments mentioned above.

In this case, in the same manner as the cord manufacturing apparatus 10A in accordance with the first embodiment, a pellet manufacturing apparatus can be structured by setting the cutting portion 102 and the pellet recovery portion 104 in place of the cord recovery portion 18 in the cord manufacturing apparatuses 10B to 10E in accordance with the second to fifth embodiments.

Embodiment 6

Figure 19:
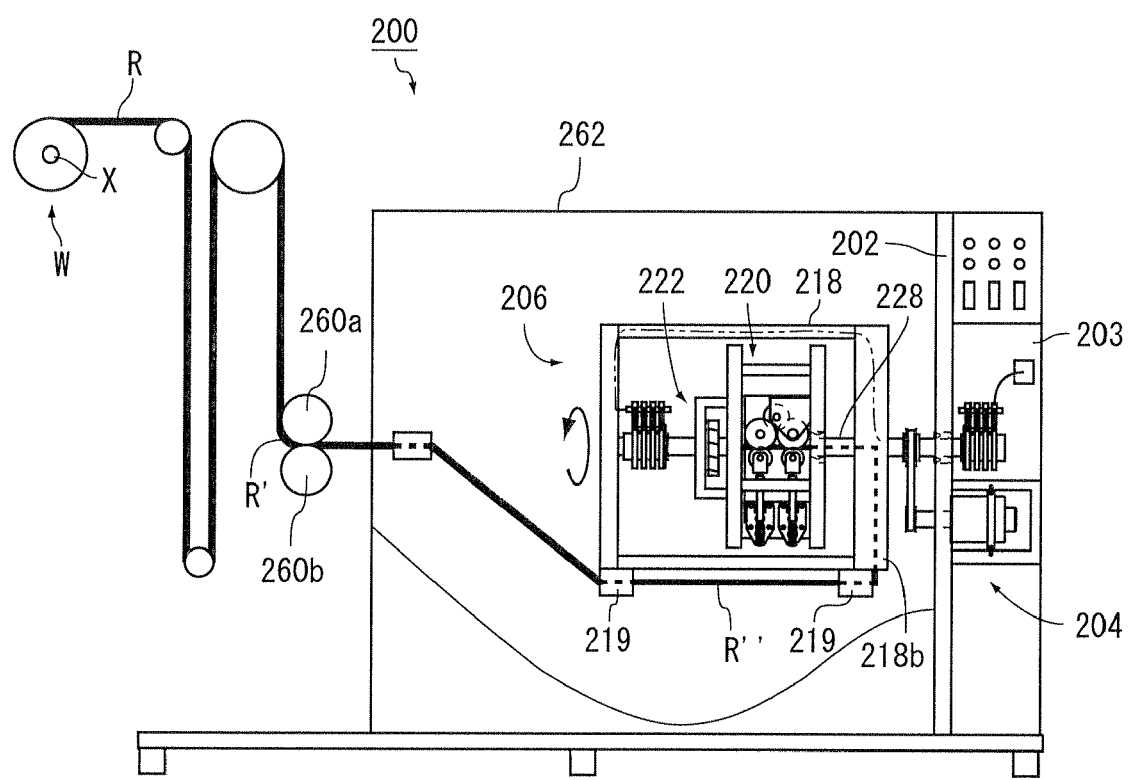
FIG. 19 is a front view showing a manufacturing apparatus of a pellet accordance with a sixth embodiment.
Figure 20:
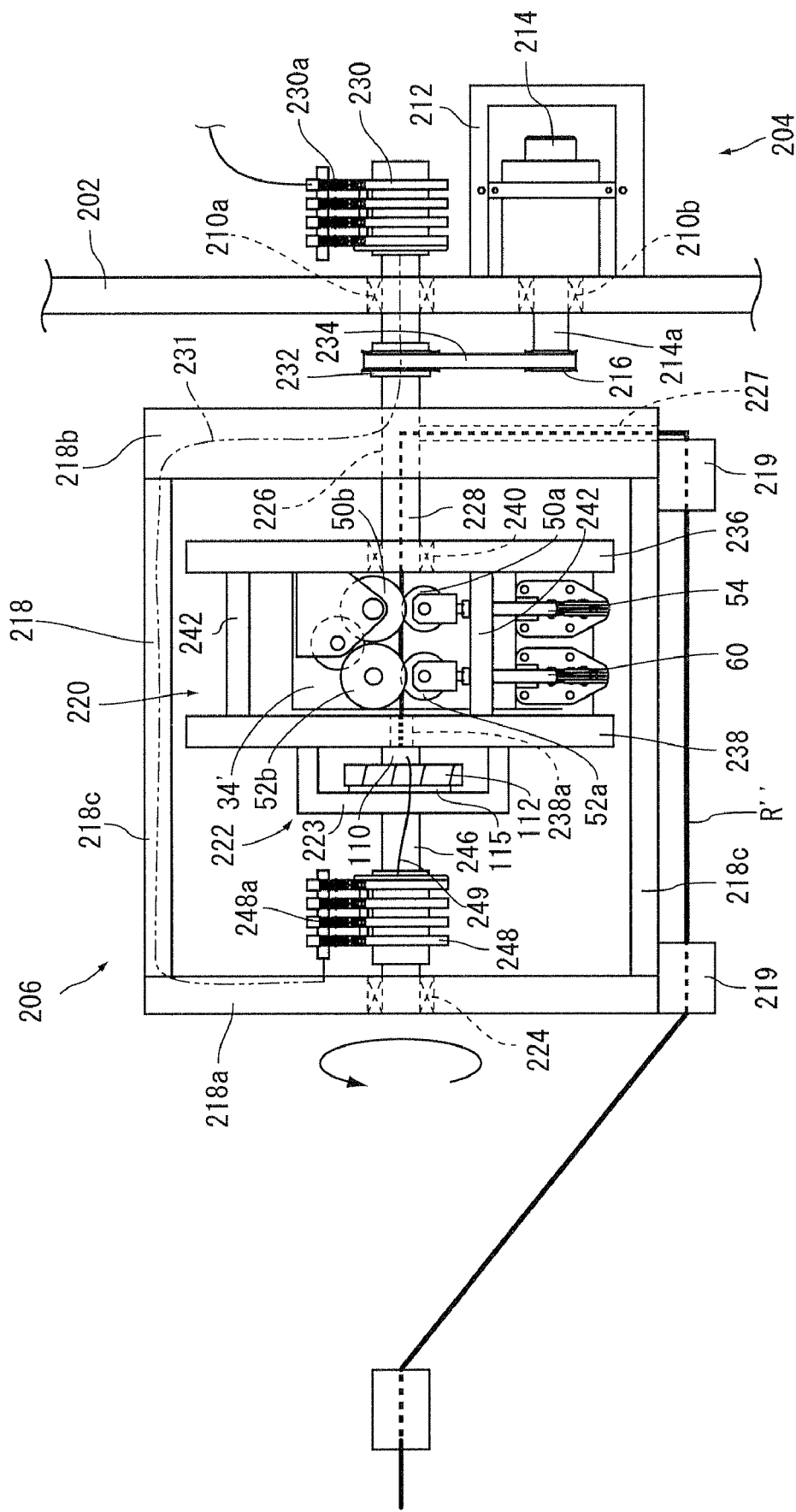
FIG. 20 is a figure showing an apparatus main body.

A description will be finally given of a pellet manufacturing apparatus 200 shown in FIGS. 19 to 20. The pellet manufacturing apparatus 200 is provided with a support plate 202, a rotation portion 204 and an apparatus main body 206, as is known from FIG. 19.

The support plate 202 corresponds to a plate-like member for supporting the rotation portion 204, the apparatus main body 206 and the like, and two bearing members 210a and 210b are fixed to a center portion thereof side by side vertically.

The rotation portion 204 is provided for rotating a rotation flame 218 of the apparatus main body 206 mentioned below, and has a frame 212 fixed to a side portion of the support plate 202, and a motor 214 attached to the frame 212.

A rotating shaft 214a of the motor 214 is rotatably supported to the bearing member 210b, and a drive pulley 216 is attached to a leading end thereof.

The apparatus main body 206 is constituted by the rotation frame 218, a compressing portion 220 and a cutting portion 222. The rotation frame 218 has an upstream side plate 218a, a downstream side plate 218b, and a plurality of (four in the present embodiment) connection members 218c connecting the upstream side plate 218a and the downstream side plate 218b (of course, the number of the connection members 218c may be set to two, may be set to three, or may be set to five or more. Further, in the present embodiment, the upstream side plate 218a, the downstream side plate 218b and the connection members 218c are structured as the independent members, however, the structure may be made, for example, such that the upstream side plate 218a and the connection members 218c are integrally formed, or all the members may be integrally formed.). In this case, two cord-shaped bunched material guides 219 bunching the long continuous materials R to the narrow width so as to form the cord-shaped bunched material R' are attached to a bottom portion of the rotation frame 218.

The upstream side plate 218a corresponds to a disc-shaped member arranged in a supply side (an upstream side) of the long continuous material R (a left side in FIG. 20), and a bearing member 224 is fixed to a center thereof.

The downstream side plate 218b is formed at an almost equal size to the upstream side plate 218a, and corresponds to a disc-shaped member arranged in a downstream side of the upstream side plate 218a.

A hole 226 is formed in a center of the downstream side plate 218b, and a communication hole 227 communicating the hole 226 with an outer surface is formed in a radial direction of the downstream side plate 218b.

In this case, a tubular shaft body 228 is inserted and fixed to the hole 226, and a downstream side leading end portion of the shaft body 228 is rotatably supported to a bearing member 210a fixed to the support plate 202.

In this case, a slip ring 230 is attached to a downstream side end portion of the shaft body 228, and a feeding brush 230a attached to a control panel 203 provided in a side portion of the support plate 202 is brought into slidable contact with the slip ring 230.

Further, a driven pulley 232 is integrally provided in a portion between the support plate 202 and the downstream side plate 218b in the shaft body 228, and a belt 234 is wound between the driven pulley 232 and the drive pulley 216.

The compressing portion 220 has a downstream side table 236, an upstream side table 238 and a roller mounting plate 34'. The downstream side table 236 corresponds to a disc-shaped member, and a bearing member 240 is fixed to a center thereof. Further, an upstream side end portion of the shaft body 228 mentioned above is rotatably supported to the bearing member 240.

The roller mounting plate 34' and a plurality of (three in the present embodiment) support columns 242 are provided on a board surface (an upstream side) of the downstream side table 236, and the upstream side table 238 is attached to an upstream side end portion of the support column 242.

The upstream side table 238 corresponds to a disc-shaped member formed at an almost equal size to the downstream side table 236, and a hole 238a is formed in a center thereof. The cutting portion 222 mentioned below is provided in a board surface (an upstream side) of the upstream side table 238, and a leading end portion of a shaft body 246 attached to the upstream side of the cutting portion 222 is rotatably supported to the bearing member 224. In this case, the shaft bodies 228 and 246 are coaxially attached.

A slip ring 248 is attached to a middle stage portion of the shaft body 246, and a feeding brush 248a provided in the rotation frame 218 (the upstream side plate 218a) is brought into slidable contact with the slip ring 248.

Since the structure of the roller mounting plate 34' is the same as the roller mounting plate 34 in accordance with the first embodiment except the point that the compressing rollers 50a and 50b and the drawing rollers 52a and 52b are inversely arranged, the description mentioned above is applied to a description thereof.

The cutting portion 222 is mainly constituted by a frame 223, a motor 110 fixed to the upstream side table 238, a cutter 112 attached to a rotating shaft of the motor 110, and a cord fixing member 115 attached to the frame 223.

Next, a description will be given of a method of manufacturing the pellet P by using the pellet manufacturing apparatus 200 in accordance with the present embodiment. When manufacturing the pellet P by using the pellet manufacturing apparatus 200, the leading end of the long continuous material R is drawn out from the long continuous material wind-up body W provided in the upstream side of the pellet manufacturing apparatus 200. Further, the long continuous material R is set to a predetermined feeding path, that is, a pair of bunching rollers 260a and 260b provided in an upstream side of the rotation frame 218, the cord-shaped bunched material guide 219, the communication hole 227 of the downstream side plate 218b and the shaft body 228, and the leading end portion thereof is pinched between the drawing rollers 52a and 52b. An important thing here exist in a point that the feeding direction of the long continuous material R is inverted in the middle of passing through the rotation frame 218.

Subsequently, the motor 214 of the rotation portion 204 is driven. In this case, when the motor 214 is rotated, the rotating force of the motor 214 is transmitted to the rotation frame 218 via the drive pulley 216, the belt 234, the driven pulley 232 and the shaft body 238, and the rotation frame 218 is rotated with respect to the support plate 202. In this case, since the shaft bodies 228 and 246 are rotatably supported by the bearing members 240 and 224 respectively at this time, the compressing portion 220, the cutting portion 222 and the slip ring 248 within the rotation frame 218 are held in a stationary state without being rotated.

In this case, if an electric power is fed to the feeding brush 230a, the electric power is fed to the motors 110 and 56 via the slip ring 230, a conducting wire 231 derived from the slip ring 230, a feeding brush 248a provided in the rotation frame 218, the slip ring 248 and a conducting wire 249 derived from the slip ring 248. If all the motors 214, 110 and 56 are driven in the manner mentioned above, the rotation frame 218 is rotated with respect to the support plate 202, the long continuous material R drawn out from the long continuous material wind-up body W is fed to the compressing rollers 50a and 50b, and the cutter 112 of the cutting portion 222 starts rotating.

If the long continuous material R drawn out from the long continuous material wind-up body W is fed to the rotation frame 218 through the bunching rollers 260a and 260b, the long continuous material R is bunched to the narrow width so as to form the cord-shaped bunched material R'. Further, the cord-shaped bunched material R' is twisted on the basis of the rotation of the rotation frame 218 so as to be in the twisted wound state, and the formation of the twisted cord material R" is started.

An important thing here exists in a point that the cord-shaped bunched material R' is twisted at two times in the case that the rotation frame 218 is rotated at one time. In other words, the cord-shaped bunched material R' is twisted at one time at a time of being fed toward the downstream side from the upstream side on the rotation frame 218, and is twisted at the second time at a time when the feeding direction is inverted and the cord-shaped bunched material R' is fed toward the upstream side from the downstream side.

In this case, the degree of twisting of the twisted cord material R" is appropriately defined in correspondence to a relation between the rotating speed of the rotation frame 218 (that is, the rotating speed of the motor 214) and the supply speed of the long continuous material R (that is, the rotating speed of the motor 56).

The twisted cord material R" twisted at a predetermined degree of twisting and fed to the compressing portion 220 is point compressed by passing through the compressing rollers 50a and 50b, and the cord S is formed. However, since this point is the same as the embodiment mentioned above, the description of the embodiment mentioned above is applied to a description thereof.

If the cord S discharged from the drawing rollers 52a and 52b is derived to the cutting portion 222, the cord S is continuously cut to a predetermined length on the basis of the rotation of the cutter 112, whereby the pellet P is formed. In this case, the length in the axial direction of the pellet P can be freely adjusted by appropriately adjusting the rotating speed of the cutter 112 and the feeding speed of the cord S.

Further, the cut pellet P is flipped in a circumferential direction of the cutter 112 on the basis of a centrifugal force of the cutter 112, and thereafter comes down on the ground due to its own empty weight. In this case, in the present embodiment, an entire of the manufacturing apparatus 200 is covered by a cover 262, and the flipped pellet P is brought into contact with the cover 262 so as to come down, and is collected to the lower side of the apparatus main body 206.

In the present embodiment, since the long continuous material R is moved from the upstream side to the downstream side along the rotating axis on the rotation frame 218, and is thereafter inverted, the long continuous material R (the cord-shaped bunched material R') is twisted at two times in accordance with one rotation of the rotation frame 218. In other words, since it is possible to apply more twisting times by less rotating time, it is possible to form the pellet P having a higher density.

In this case, in the embodiment mentioned above, the rotating shaft (that is, the shaft bodies 228 and 246) of the apparatus main body 206 is provided in a horizontal direction (a lateral direction in FIG. 20), however, the rotating shaft may be provided in a vertical direction or may be provided in a diagonal direction.

Figure 21:
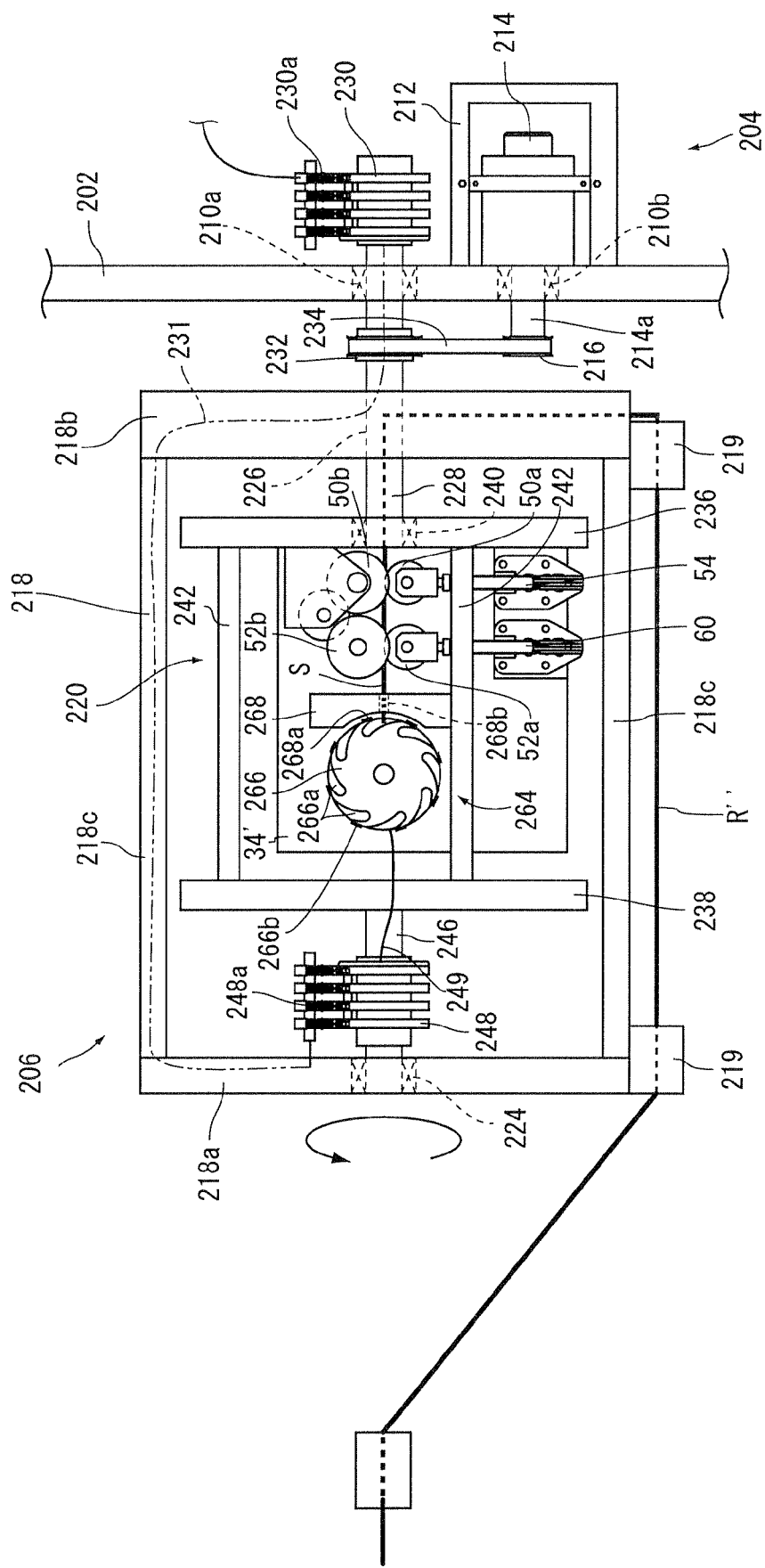
FIG. 21 is a figure showing a modified embodiment of the cutting portion.

Further, the structure of the cutting portion is not limited to the embodiments mentioned above, but the structure may be made, for example, such that a rotating shaft of a cutter 266 constituting the cutting portion 264 is provided in an almost orthogonal direction to the supplying direction of the cord S, as shown in FIG. 21. In this case, in the present modified embodiment, the cutting portion 264 is provided on the roller mounting plate 34'.

The cutting portion 264 is mainly constituted by a motor (not shown) fixed to an outlet side of the compressing portion 220 on the roller mounting plate 34', the cutter 266 attached to a rotating shaft of the motor, and a guide 268 provided between the cutter 266 and the compressing portion 220, as is known from FIG. 21.

The cutter 266 corresponds to an almost disc-shaped member made by a rigid material such as a metal or the like, a plurality of (eight in the present embodiment) spiral grooves 266a are formed on an outer surface thereof, and blades 266b are respectively attached to chevron portions between the grooves 266a and 266a.

The guide 268 corresponds to a block-shaped member, and a curved surface 268a is formed in a surface in an opposing side to the cutter 266 so as to be along an outer surface of the cutter 266. Further, a cord insertion hole 268b is formed in a center of the guide 268 in such a manner as to communicate the curved surface 268a with an opposite surface to the curved surface 268a.

In the present modified embodiment, the cord S discharged from the compressing portion 220 is fed to a gap between the guide 268 and the cutter 266 through the cord insertion hole 268b formed in the center of the guide 268. Further, the portion protruding from the curved surface 268a of the cord S is cut by the cutter 266, and the pellet P is formed.

In this case, it goes without saying that the structure of the cutting portion 264 described in the present modified embodiment can be applied to the pellet manufacturing apparatus in accordance with the first to fifth embodiments mentioned above.

INDUSTRIAL APPLICABILITY

The present invention relates to the cord and the pellet manufactured by using a lot of defective goods, cut scraps or the like generated in the forming work site of the resin products as the cord, a manufacturing method or a manufacturing apparatus for recycling them as the cord and the pellet. Accordingly, it is possible to do away with the waste of the resources.

The invention claimed is:

1. A pellet manufacturing apparatus comprising:
   (a) a pair of bunching rollers for bunching one or more continuously-fed, band-like, long, continuous, synthetic resin material and/or one or more continuously-fed, filamentous, long, continuous, synthetic resin material and feeding bunched continuous material downstream of the bunching rollers;
   (b) a rotation means for forming a twisted cord material by twisting the bunched, continuous material as the bunched, continuous material exits the bunching rollers;
   (c) a pair of compressing rollers downstream of the bunching rollers for receiving the twisted cord material, the compressing rollers having an uneven outer surface for forming a cord having dented pressed indentations on its surface by point compression to the twisted cord material; and
   (d) a cutter provided at an outlet side of the compressing rollers, the cutter forming a pellet having dented pressed indentations in a dot shape on its surface by cutting the cord formed with the point compression at intervals wider than intervals of the dented pressed indentations.

2. A pellet manufacturing apparatus comprising:
   (a) a pair of bunching rollers for bunching one or more continuously-fed, band-like, long, continuous, synthetic resin material and/or one or more continuously-fed, filamentous, long, continuous, synthetic resin material and feeding bunched, continuous material downstream of the bunching rollers;
   a pair of compressing rollers positioned downstream of the bunching rollers and having an uneven outer surface;
   (c) a cutter positioned downstream of the compressing rollers;
   (d) a rotation frame having a rotation axis arranged in substantially parallel to a feeding direction of the bunched continuous materials, guiding the bunched continuous materials exits from the bunching rollers to rotate around the compressing rollers and the cutter, to invert the feeding direction in the middle, and to feed to the compressing rollers;
   (e) the compressing rollers forming a cord having dented pressed indentations on its surface by point compression to a twisted cord material twisted by a rotation of the rotation frame; and
   (f) the cutter forming a pellet having dented pressed indentations in a dot shape on its surface by cutting the cord at intervals wider than intervals of the dented pressed indentations.

* * * * *